US006735055B1

(12) United States Patent
Crane et al.

(10) Patent No.: US 6,735,055 B1
(45) Date of Patent: May 11, 2004

(54) MICROACTUATOR STRUCTURE WITH VIBRATION ATTENUATION PROPERTIES

(75) Inventors: Peter Crane, Richfield, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 427 days.

(21) Appl. No.: 09/853,061

(22) Filed: May 10, 2001

Related U.S. Application Data

(63) Continuation-in-part of application No. 09/306,581, filed on May 6, 1999, now Pat. No. 6,362,939.
(60) Provisional application No. 60/207,134, filed on May 24, 2000, and provisional application No. 60/084,061, filed on May 7, 1998.

(51) Int. Cl.$^7$ ................................................. G11B 5/58
(52) U.S. Cl. .................................. 360/294.6; 360/294.5
(58) Field of Search ............................... 360/294, 294.1, 360/294.2, 294.3, 294.4, 294.5, 294.6, 78.05, 245.3, 245.4

(56) References Cited

U.S. PATENT DOCUMENTS

| | | | |
|---|---|---|---|
| 5,025,346 A | 6/1991 | Tang et al. | 361/283 |
| 5,126,903 A | 6/1992 | Matsuzaki | 360/244.4 |
| 5,364,742 A | 11/1994 | Fan et al. | 430/317 |
| 5,461,272 A | 10/1995 | Matsumoto | 310/309 |
| 5,539,267 A | 7/1996 | Fan et al. | 310/309 |
| 5,657,188 A | 8/1997 | Jurgenson et al. | 360/294.3 |
| 5,711,063 A | 1/1998 | Budde et al. | 29/603.06 |
| 5,724,015 A | 3/1998 | Tai et al. | 335/78 |
| 5,805,375 A | 9/1998 | Fan et al. | 360/78.12 |
| 5,828,644 A | 10/1998 | Gage et al. | 369/112 |
| 5,856,896 A | 1/1999 | Berg et al. | 360/245.3 |
| 5,862,010 A | 1/1999 | Simmons et al. | 360/97.01 |
| 5,862,015 A | 1/1999 | Evans et al. | 360/244.1 |
| 5,867,347 A | 2/1999 | Knight et al. | 360/294.5 |
| 5,898,544 A | 4/1999 | Kninke et al. | 360/294.5 |
| 5,936,805 A | 8/1999 | Imaino | 360/294.5 |
| 6,078,473 A | 6/2000 | Crane et al. | 360/294.6 |
| 6,122,149 A | 9/2000 | Zhang et al. | 360/294.5 |
| 6,239,952 B1 * | 5/2001 | Bonin | 360/294.4 |

OTHER PUBLICATIONS

Micro–Machined Components in Magnetic Recording Heads, Manuscript, Aaron Swann et al., Nov. 3, 1998.
Applications For Micro–Machined Components in Magnetic Recording Heads, Presentation, Aaron Swann et al., Nov. 3, 1998.

* cited by examiner

*Primary Examiner*—David Ometz
(74) *Attorney, Agent, or Firm*—Kinney & Lange, P.A.

(57) ABSTRACT

A microactuator suspension supports a slider. The microactuator suspension has at least a first resilient support extending from a slider attachment pad to a suspension arm attachment pad. The slider attachment pad forms a clip which contacts the slider on side faces of the slider, and the microactuator adds little or nothing to the vertical thickness of the head gimbal assembly. The suspension arm attachment pad attaches to the gimbal with an attachment bridge which is longitudinally balanced relative to the gimbal point and relative to the air bearing centroid of the slider. The resilient supports may be beams having ends which are longitudinally spaced relative to the gimbal point, to the air bearing centroid, and to the attachment bridge to minimize moments and localized stresses on the beams. Dual beam and multiple beam arrangements are provided. The microactuator suspension further provides vibration attenuation at the slider of vibrations experienced by the suspension arm.

16 Claims, 23 Drawing Sheets

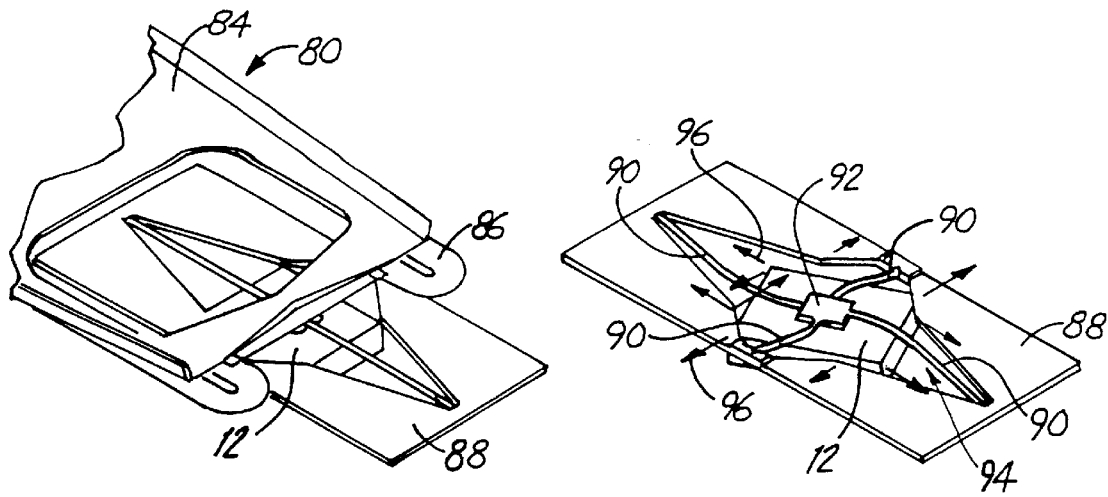
Fig. 6
PRIOR ART
Fig. 7
PRIOR ART
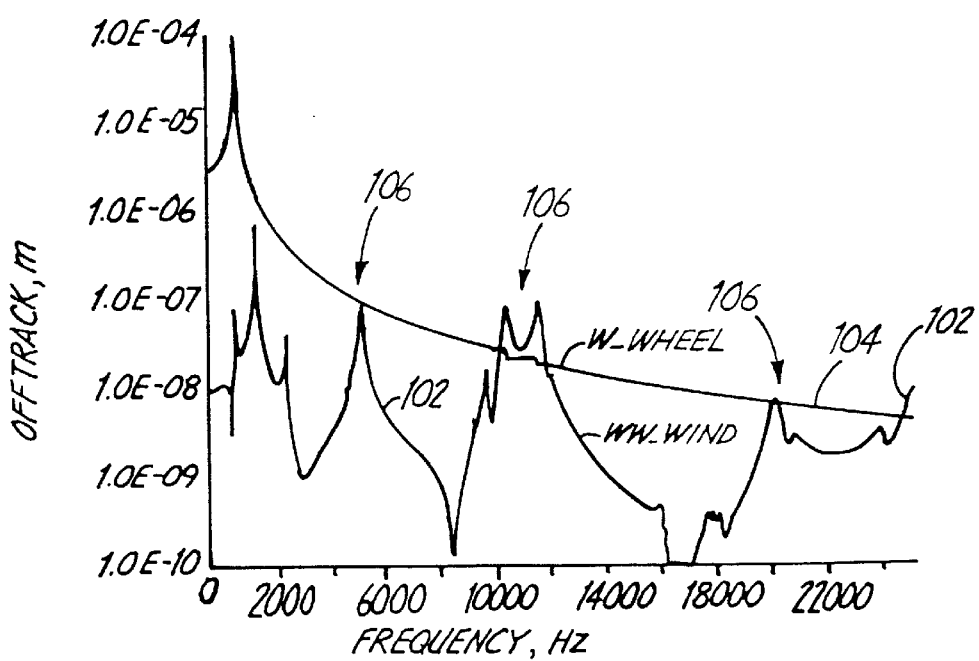
Fig. 8

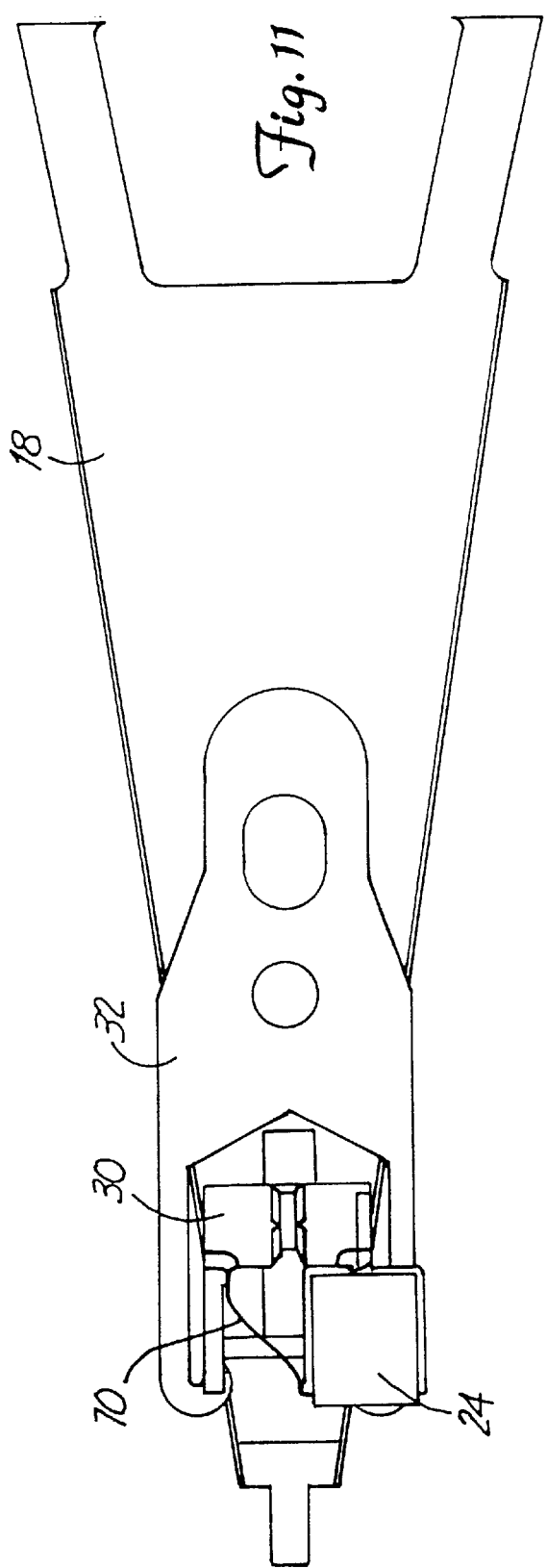
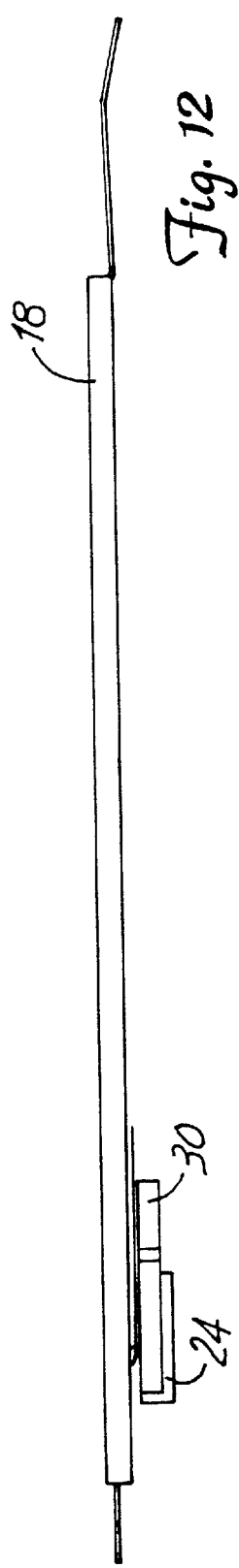

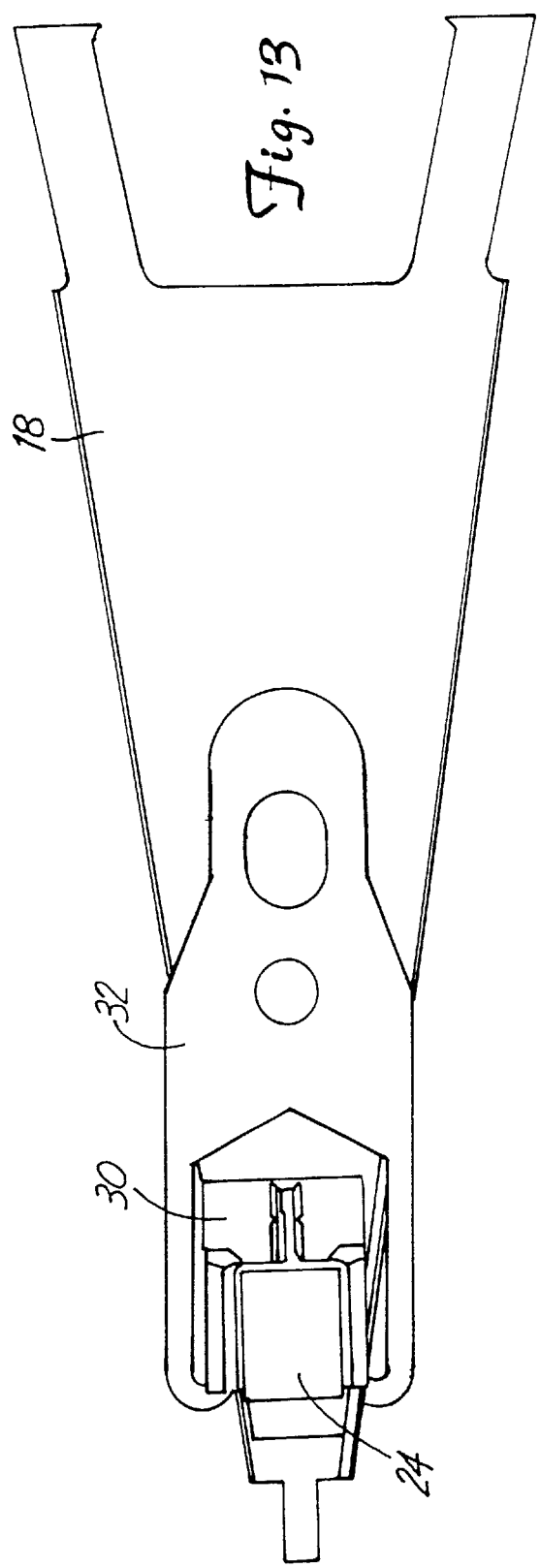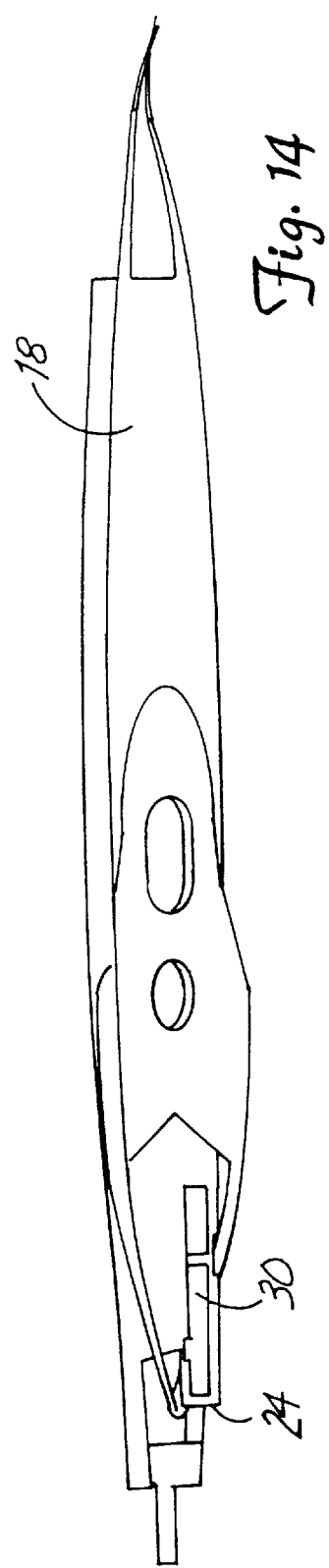

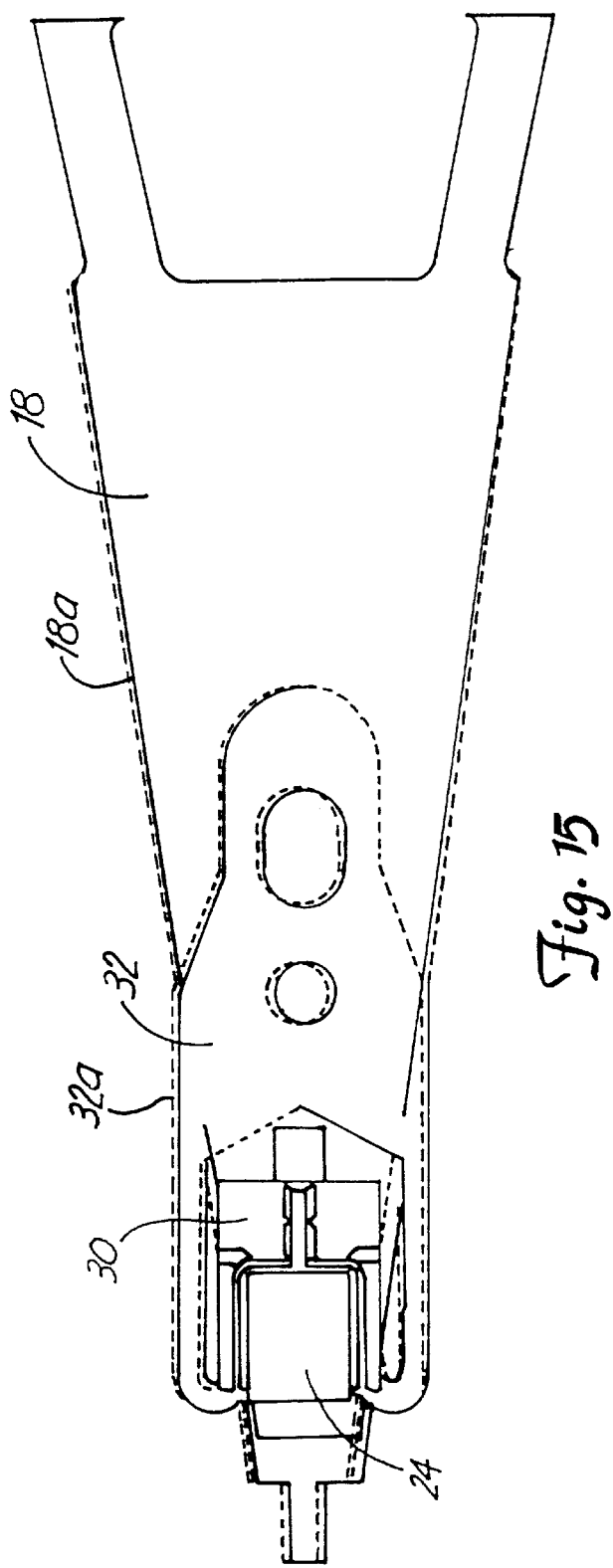
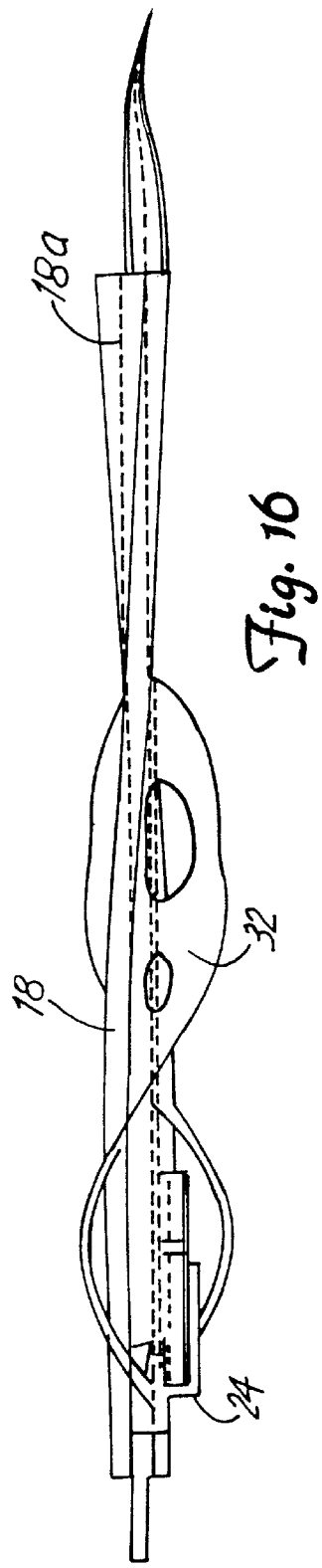

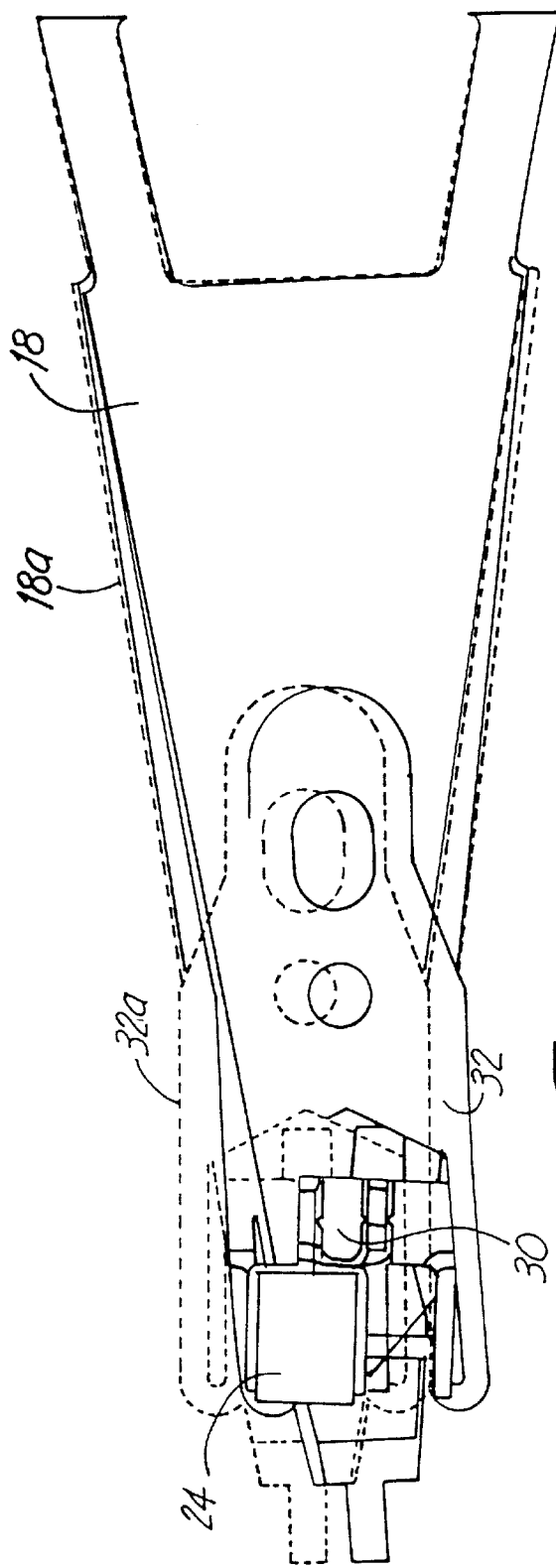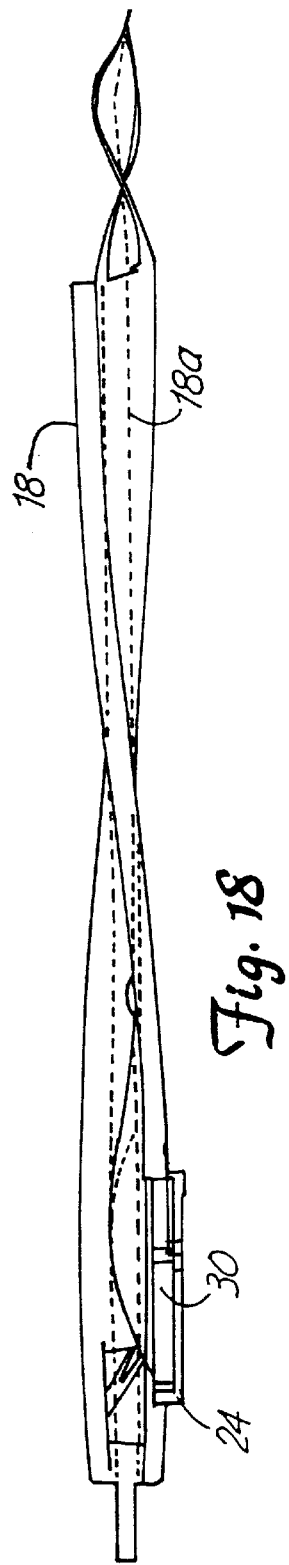

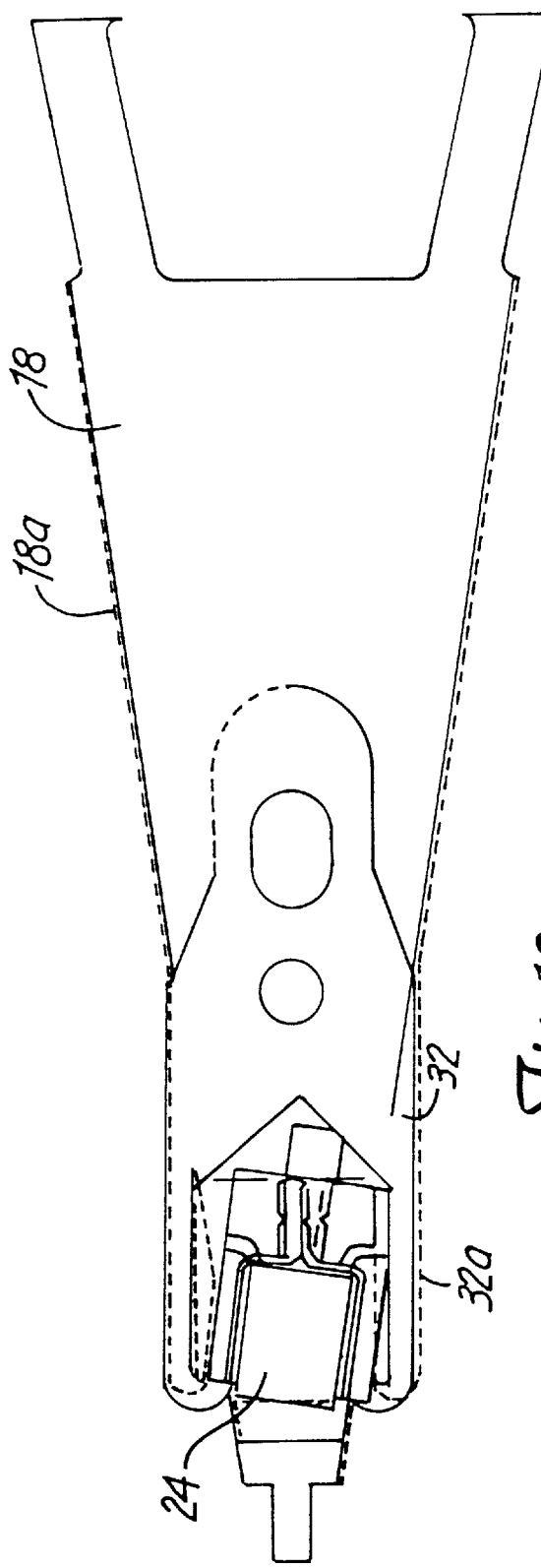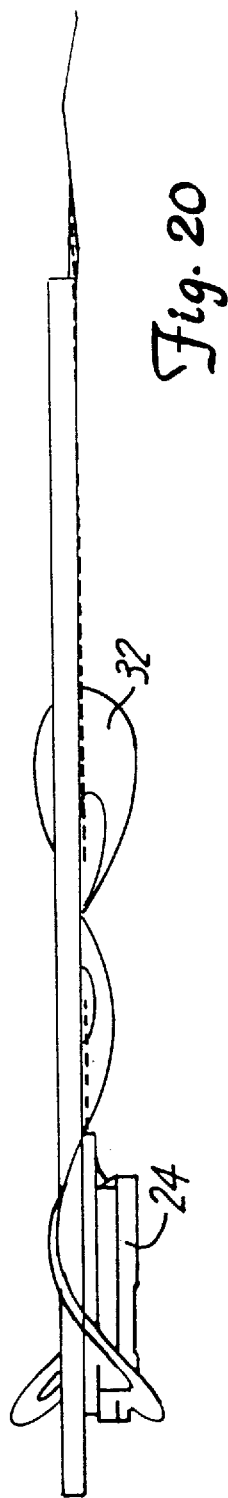

MICROACTUATOR STRUCTURE WITH VIBRATION ATTENUATION PROPERTIES

CROSS-REFERENCE TO RELATED APPLICATION(S)

This application is a Continuation-In-Part of U.S. patent application Ser. No. 09/306,581, filed May 6, 1999 entitled "BALANCED MICROACTUATOR SUSPENSION", now U.S. Pat. No. 6362,939. In addition, this application claims priority from Provisional Application No. 60/207,134, filed May 24, 2000, entitled "MICROACTUATOR STRUCTURE WITH VIBRATION ATTENUATION PROPERTIES." application Ser. No. 09/306,581 in turn claims priority from Provisional No. 60/084,061, filed May 7, 1998, entitled "IMPROVED ELECTROMAGNETIC MICROACTUATOR".

BACKGROUND OF THE INVENTION

The present application relates to data storage devices, and particularly to suspensions used in microactuators for sliders in data storage devices.

Many data storage devices are used in computer equipment which include a moving medium such as a disc upon which information is stored in concentric tracks. A head is traversed over the surface of the disc to read information from the disc and/or write information to the disc. For instance, the disc can be a magnetic disc or an optical disc.

In many high density storage devices, the head is mounted on a slider. The slider includes an air bearing surface which opposes the disc surface. As the disc rotates, the disc drags the air in a "wind" under the slider along the air bearing surface in a direction approximately parallel to the tangential velocity of the disc. The air incident on the air bearing surface creates a lifting force that causes the slider to lift and fly in immediate proximity over the disc surface. The magnitude of the hydro-dynamic lifting force depends on the air bearing properties of the slider and the speed of rotation of the disc. A preload force is supplied to the slider to counteract the hydro-dynamic lifting force. The magnitude of the preload force is designed to be in equilibrium against the lifting force at a desired flying height, positioning the slider as close as reliably possible to the moving disc surface.

The slider is typically supported on a load beam which provides the preload on the slider toward the disc. The load beam is in turn supported on an actuator arm which is moved relative to the disc surface, such as by a voice coil motor. The load beam at its distal end includes a gimbal which allows the slider to pitch and roll about a gimbal point relative to the surface of the disc.

There is a continual desire with data storage devices to decrease size, increase storage density, and reduce cost. To decrease size and increase storage density, tracks on the disc at which data is stored are positioned closer and closer together. Higher track densities make positioning of the head more important for accurate reading and writing of data. As track density increases, it becomes increasingly difficult for the voice coil motor and servo control system to quickly and accurately center the head over the desired track.

As precise positioning of the head becomes more critical, it also becomes more difficult to accurately position the head with a single actuation source. Accordingly, microactuators have been proposed to further position the head relative to the disc. The microactuator provides fine position control, while the large actuator arm provides macro position control so the head can transverse over the entire surface of the disc.

Microactuators have been proposed in several locations: between the actuator arm and the load beam, between the load beam and the slider, and between the slider and the transducer or optical element. For microactuators placed between the slider and the transducer or optical element, a tiny size is critical so as to not interfere with the flying characteristics of the slider. For other locations of microactuator placement, strength of the microactuator suspension is important, because the microactuator suspension must transmit forces between the slider and the actuator arm as well as provide fine position control. The present invention particularly relates to such microactuator suspensions which transmit forces between the actuator arm and the slider.

Microactuator suspensions include two pads connected by a flexible, resilient support element to allow movement of the two pads relative to each other. A motive element is included which provides the force for movement of the two pads relative to each other. For instance, the motive element can be an electromagnet, with a stator positioned on one of the pads and a magnetically responsive element positioned on the other of the pads. Various other types of motive elements, including electrostatic, piezoelectric elements, etc. can alternatively be used to move one pad relative to the other for fine position control.

BRIEF SUMMARY OF THE INVENTION

A microactuator suspension assembly includes a microactuator suspension supporting a slider. The microactuator suspension has at least a first resilient support extending from a slider attachment pad to a suspension arm attachment pad. In one aspect, the slider attachment pad contacts the slider on a side face of the slider, and the microactuator adds little or nothing to the vertical thickness of the head gimbal assembly. In another aspect, the suspension arm attachment pad attaches to the gimbal with an attachment bridge which is longitudinally balanced relative to the gimbal point and air bearing centroid of the slider, and moments and localized stresses on the resilient support are minimized.

A benefit of the microactuator suspension is that it acts a mechanical low pass filter attenuating vibrations experienced by the slider. Specifically, the resilient supports comprise one or more beams which support the slider. These beams act as a simple spring mass system having a single resonant frequency, followed by attenuation or "rolloff". The rolloff after the microactuator resonance tends to reduce the effect of vibrations caused by the windage experienced by the microactuator as it flies above the rotating disc.

BRIEF DESCRIPTION OF THE DRAWINGS

FIG. 6 is a prior art "wagon wheel" microactuator structure mounted on a typical suspension.

FIG. 7 is an illustration of the wagon wheel microactuator as it is being rotated.

FIG. 8 is a graph illustrates the frequency response of the prior art wagon wheel microactuator to its drive signal and the frequency response of the suspension to windage forces.

FIG. 11 is a top plane view of the microactuator suspension showing the microactuator mode at 1,018 hertz.

FIG. 12 is a side view of the microactuator mode at 1,018 hertz.

FIG. 13 is a top view of the microactuator at the first torsion mode at 3,108 hertz.

FIG. 14 is a side view of the microactuator at the first torsion mode at 3,108 hertz.

FIG. 15 is a top view of the microactuator illustrating the load beam sway mode occurring at 8,832 hertz.

FIG. 16 is a side view of the microactuator illustrating the load beam sway mode at 8,832 hertz.

FIG. 17 is a top view of the microactuator illustrating the second torsion mode occurring 10,301 hertz.

FIG. 18 is a side view of the microactuator illustrating the second torsion mode at 10,301 hertz.

FIG. 19 is a top view of the microactuator suspension illustrating the gimbal yawing mode occurring at 15,809 hertz.

FIG. 20 is a side view of the microactuator suspension illustrating the gimbal yawing mode at 15,809 hertz.

DETAILED DESCRIPTION

Figure 1:
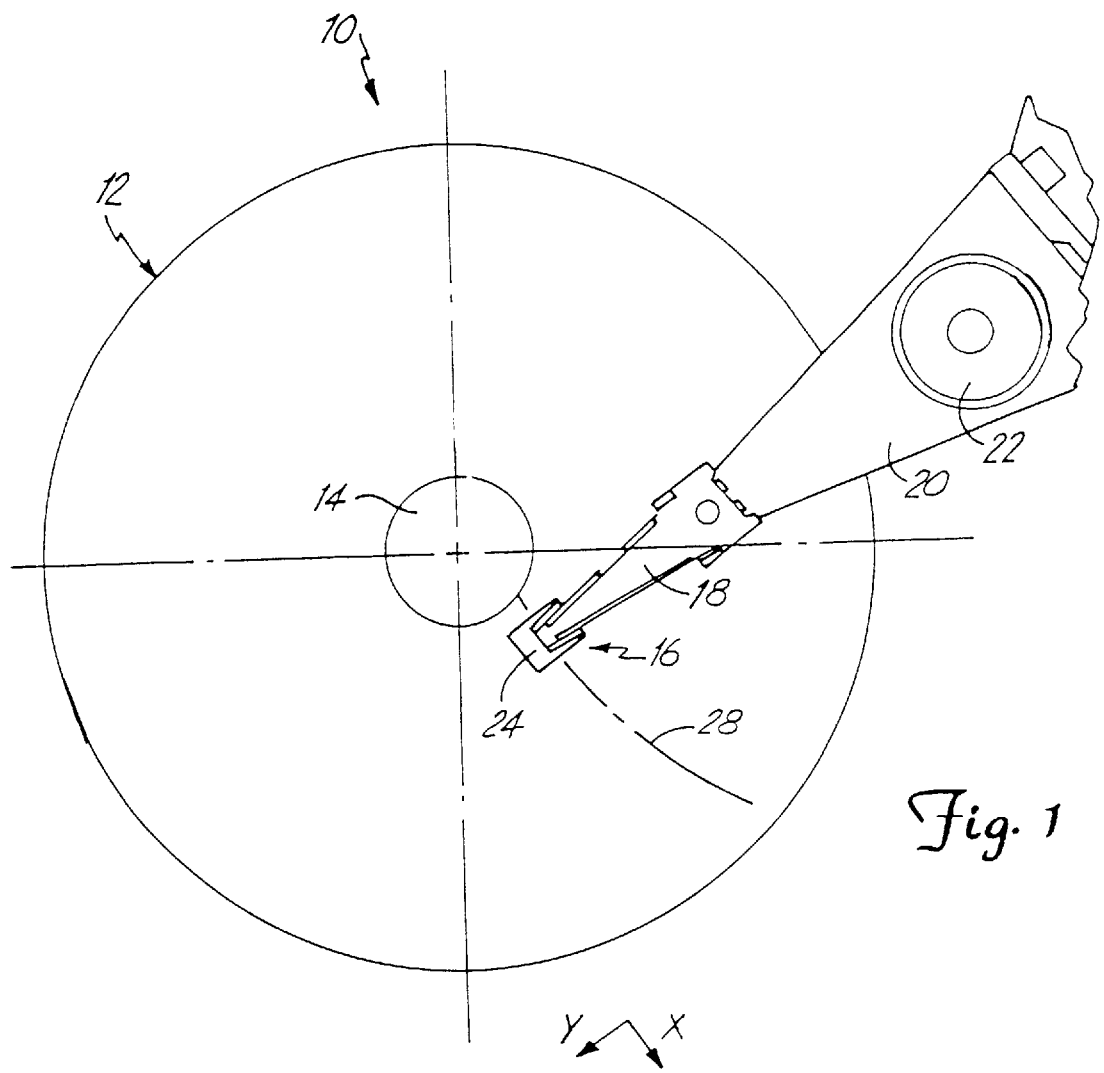
FIG. 1 is a plan view of a disc drive.

As shown in FIG. 1, a data storage device or disc drive 10 includes a disc 12 which rotates about a disc spindle 14. A head gimbal assembly 16 is supported on the end of a load beam 18, which is in turn supported on an actuator arm 20 pivotally mounted on an actuator arm spindle 22. The head gimbal assembly 16 includes a slider 24. A head, such as a transducer or other communication device (not independently shown), is supported on the slider 24, such as on a trailing face 26 (shown in FIG. 3) of the slider 24 and directed at the disc 12. The actuator arm 20 includes a voice coil motor (not shown) which causes macro positioning of the actuator arm 20 and movement of the attached head in an arc 28 to access the surface of the disc 12. Alternatively, workers skilled in the art will appreciate that the present invention is equally applicable with linear actuators as opposed to rotary actuators. With either type of actuation, movement of the actuator arm 20 positions the slider 24 and head at or near a particular desired track on the disc 12. Workers skilled in the art will also appreciate that the present invention is equally applicable regardless of the type of medium, and the term "disc" is not intended to be limiting.

During rotation of the disc 12, the disc 12 drags air under the disc opposing or air bearing surface of the slider 24 to elevate the slider 24 immediately above the surface of the disc 12. The load beam 18 places a preload force in the negative z-direction on the slider 24, pressing the slider 24 toward the disc 12. For example, a preload force such as about 4 gmf may be used. The hydro-dynamic lifling force that the wind places on the air bearing surface counteracts this preload force to elevate the slider 24 a small flying height above the disc 12.

Figure 2:
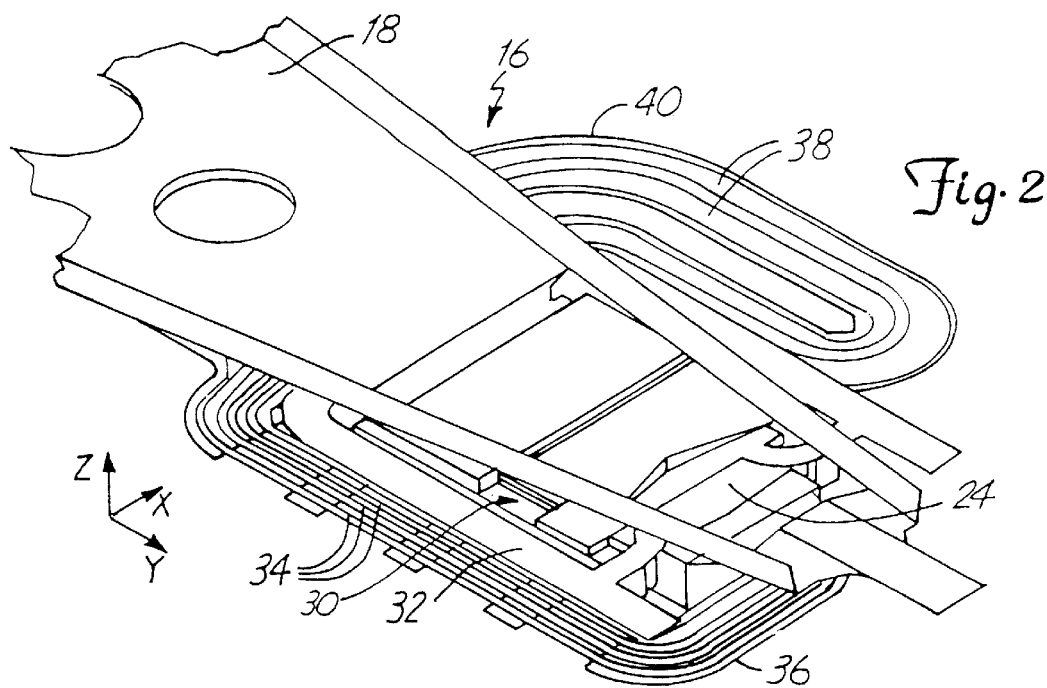
FIG. 2 is a perspective view of a first embodiment of a head gimbal assembly of the present invention.

FIG. 2 shows an enlarged view of the head gimbal assembly 16 attached to the load beam 18 of FIG. 1. The slider 24 is supported by a microactuator suspension 30. The microactuator suspension 30 is supported by a gimbal 32 formed of a thin, resilient material. Electrical leads 34 are provided in a flex circuit 36 to the transducers. If the present invention is applied to an optical storage system, the electrical leads may alternatively be replaced with optical leads. Electrical leads 38 are also provided in a flex circuit 40 to the motive element 42 of the microactuator 44. The flex circuits 36, 40 may be formed with a thin layer of polyimide, for instance, to insulate and protect the leads 34, 38. The flex circuits 36, 40 provide no substantial support for the slider 24, and conversely provide no restriction to movement of the slider 24 by the microactuator 44.

Figure 3:
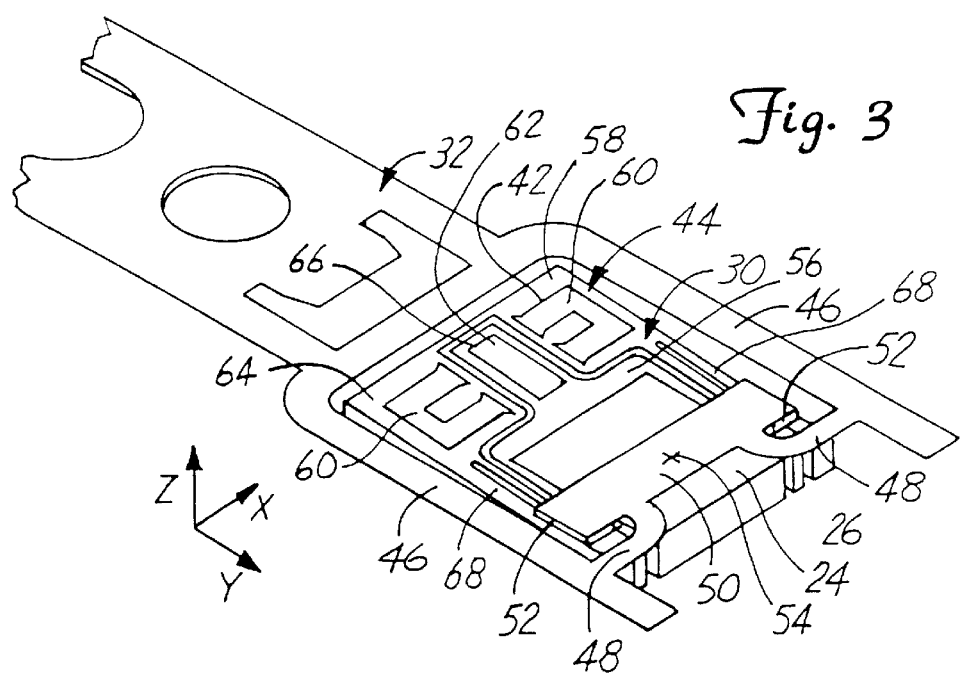
FIG. 3 is a perspective view of the gimbal and head of FIG. 2 without the load beam.

FIG. 3 shows the gimbal 32, slider 24 and microactuator suspension 30 of FIG. 2 without the load beam 18 and without the electrical leads 34, 38. The preferred gimbal 32 includes opposing arms 46 extending over a length slightly longer than the length of the slider 24 and microactuator suspension 30. The gimbal arms 46 are separated from each other by a distance slightly greater than the width of the slider 24 and microactuator suspension 30. Curved extensions 48 project inward from the arms 46 to a central cross-support 50. The central cross-support 50 is attached to the microactuator suspension 30 by two spaced attachment bridges 52. The central cross-support 50 may include a dimple which defines a gimbal point 54 (represented by cross-hairs). The geometry of the gimbal 32 together with the flexibility and resilience of the gimbal material allows pitch and roll movement of the microactuator suspension 30 and attached slider 24 about the gimbal point 54. At the same time, the gimbal 32 supports the preload force and is able to withstand stiction forces.

The microactuator suspension 30 includes a slider attachment pad 56 and a suspension arm attachment pad 58. A motive element 42 is fabricated with part on the slider attachment pad 56 and part on the suspension arm attachment pad 58. For instance, the preferred motive element 42 is electromagnetic, with stators 60 positioned on opposing sides of a magnetically responsive element 62. The stators 60 are fabricated on a stator pad portion 64 of the suspension arm attachment pad 58, and the magnetically responsive element 62 is fabricated on a tongue portion 66 of the slider attachment pad 56. The suspension arm attachment pad 58 includes spaced supporting arms 68, each of which attaches to the central cross-support 50 of the gimbal 32 with one of the attachment bridges 52.

The microactuator suspension 30 is preferably unitarily formed from a single substrate or wafer such as by photolithographic processes. The wafer thickness is preferably on the order of the thickness of the slider body 24, such as about 100 or 200 microns. The material for the microactuator suspension 30 may be selected as desired for beneficial mechanical properties and ease of processing. For instance, the microactuator suspension 30 may be formed of single crystal silicon, processed photolithographically with a fluorine etch.

The strength of single crystal silicon is largely determined by surface defects in the material. While the growth of the single crystal can be controlled to minimize defects, cracks can be initiated over time in the native oxide surface of the silicon such as by humidity and either at zero stress or under an induced stress. The crack initiation can be referred to as "stress corrosion cracking". Stress corrosion cracking can be minimized or eliminated by processing the surface of the microactuator suspension 30 through nitride or parylene passivation.

On a macro scale, single crystal silicon has a strength which is limited to about 100 MPa due to the surface defects. On a micro scale, where the existence of surface defects is less likely, single crystal silicon has a strength of from 450 to 1950 MPa. Silicon poses some problems in repeatability, in that it is not known whether surface defects will exist in any particular sample. The primary benefit of silicon is that photolithographic processing of single crystal silicon is commonly carried out in related technologies, and the knowledge of silicon processing can be applied to fabrication of the microactuator suspension 30.

Other materials may be alternatively used to fabricate microactuator suspension. In particular, metals such as Tungsten, Molybdenum, Tantalum, Niobium, Titanium or Zirconium, or alloys thereof can be photolithographically fabricated by etching in Sulfur Hexaflouride ($SF_6$) plasma, such as using the "Bosch Process" for Deep Trench Reactive Ion Etching. While photolithographic processing of these metals is less common than with silicon, these metals have a greater strength on a macro scale and thus avoid the repeatability problems associated with single crystal silicon. For instance, a 90% Tantalum/10% Tungsten alloy has a macro scale strength of 1000 MPa—ten times the macro strength of single crystal silicon. Other alloys, such as tungsten alloyed with 10 to 50% Molybdenum, or Niobium alloyed with 10% Tungsten and 2.5% Zirconium, may also provide beneficial properties. Mechanical and/or thermal processing of the metals may further increase strength. For example, cold rolled Tungsten has a macro scale strength of about 1725 MPa.

Ease of $SF_6$ etchability of the metals depends largely on the boiling (or sublimation) points of their fluorides, tabulated below at 1 atmosphere. In the near-vacuum of the RIE chamber, the metal fluorides should vaporize at lower temperatures. A disadvantage of Tungsten and Molybdenum is their high elastic modulus, which requires narrower beam springs for a given off track resonance. The stiffness of the narrower springs are affected by etch width tolerance to a greater degree and therefore microactuator suspensions built with the high modulus materials will have greater variation about the target resonant frequency.

| Metal | Fluoride | Boiling Point ° C. @ 760 Torr | Tensile Strength (Annealed), MPa | Elastic Modulus, GPa |
| --- | --- | --- | --- | --- |
| Si | Si—$F_4$ | −86 | 100 | 110 |
| W | W—$F_6$ | 18 | 124 | 345 |
| Mo | Mo—$F_6$ | 35 | 690 | 276 |
| Ta | Ta—$F_5$ | 230 | 345 | 186 |
| Nb | Nb—$F_5$ | 236 | 276 | 103 |
| Ti | Ti—$F_4$ | 284 | 207 | 110 |
| Zr | Zr—$F_4$ | 600 | 345 | 90 |
| Ta/10W | as above | as above | 1000 | ~202 |
| W/ 10—50Mo | as above | as above | | ~283–311 |
| Nb/10W/ 2.5Zr | as above | as above | | ~127 |

Plated Nickel or Aluminum could also be used for the wafer substrate for the microactuator suspension. Due to bath chemistry limitations, it is difficult to sufficiently strengthen Aluminum and Nickel materials by alloying. Cold working is not feasible with Nickel and Aluminum due to material deformation. Plated Nickel or Aluminum could be processed using deep UV or X-ray photolithography.

Figure 4:
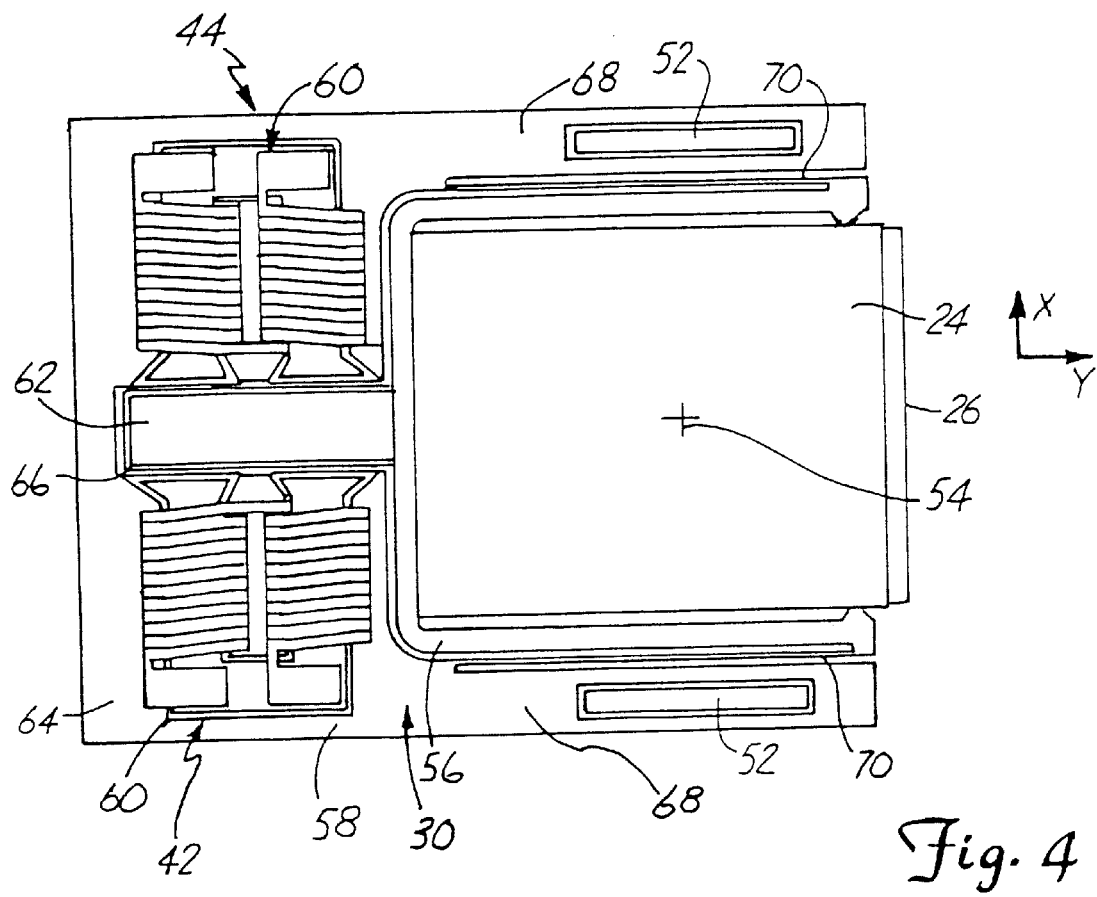
FIG. 4 is a plan view of the microactuator suspension, motive element and slider of the first embodiment of the present invention.
Figure 21:
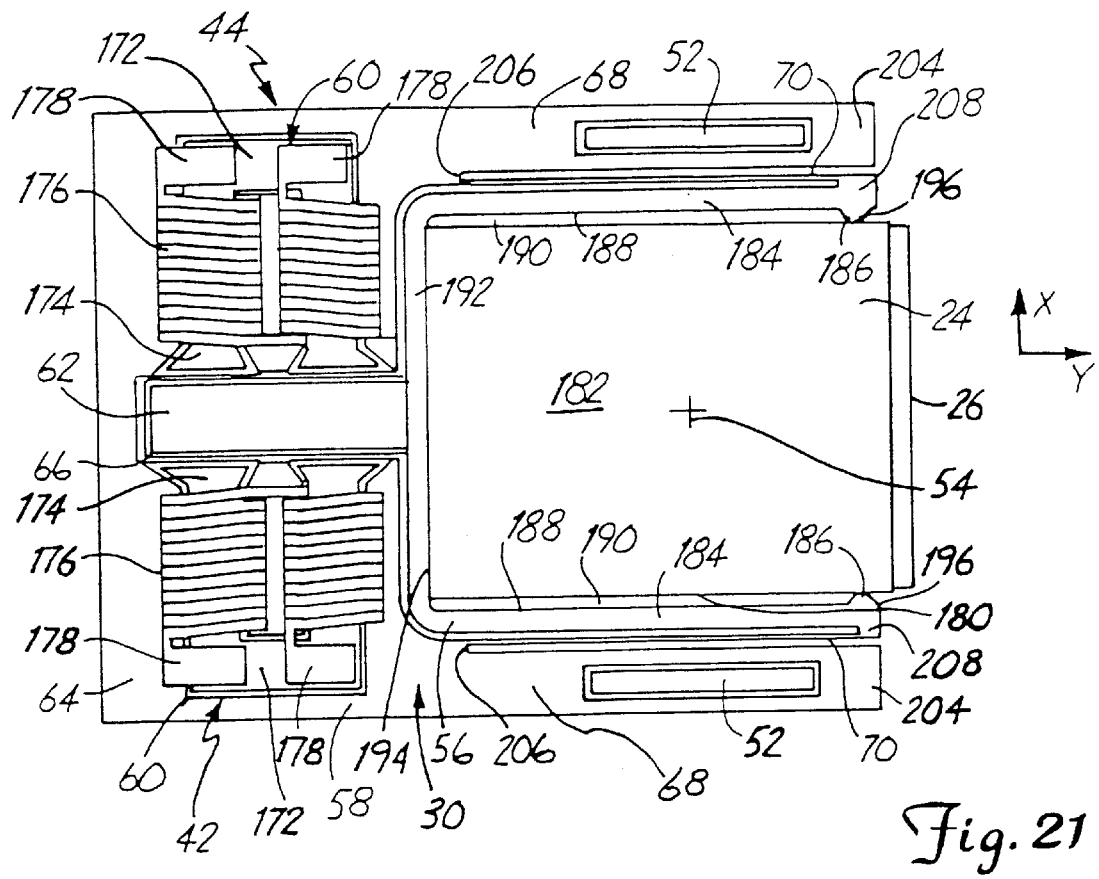
FIG. 21 is a plan view of the microactuator suspension, motive element, and slider of the first embodiment of the present invention.
Figure 22:
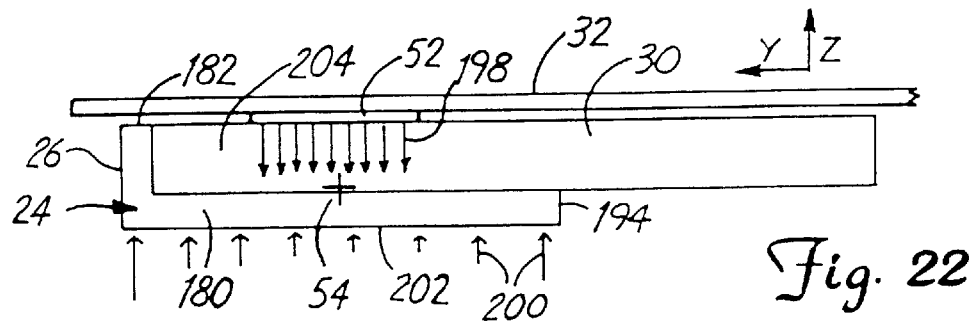
FIG. 22 is a side view of FIG. 21.

FIGS. 4, 21, and 22 show the microactuator suspension 30 in further detail. Certain structural features of the microactuator suspension 30, as well as its vibration attenuation properties, are discussed in connection with FIG. 4, while the functional aspects of the microactuator are discussed in connection with FIGS. 21 and 22.

In FIG. 4, the slider attachment pad 56 is connected to the suspension arm attachment pad 58 by first and second resilient supports, each of which in this embodiment are a single beam 70. The beams 70 run along the sides of the slider 24, and the microactuator suspension 30 is preferably symmetrical about a longitudinal axis. The beams 70 have a high aspect ratio, that is, the thickness or depth of each beam 70 is greater than the width of the beam 70, making the beam 70 more flexible in the x-direction than in the z-direction. The comparative stiffness in the z-direction allows the beam 70 to have sufficient strength to transmit the preload force between the slider attachment pad 56 and the suspension arm attachment pad 58. The comparative flexibility in the x-direction allows the beam 70 to bend under a smaller force provided by the motive element 42. The beams 70 are also considerably narrower than any stress carrying portion of either the slider attachment pad 56 or the suspension arm attachment pad 58, such that the suspension arm attachment pad 58 and the slider attachment pad 56 can be considered rigid structures compared to the flexible and resilient beams 70. The material of the microactuator suspension 30 must have a sufficient tensile strength to permit the beams 70 to withstand a stiction event, which may involve transmission of forces (primarily in the y-direction, but perhaps also with an x-component) which are an order of magnitude higher than the pre-load force.

The stiffness of the beams 70 also affects the off track resonance frequency and the off track resonance frequency variation due to the beam width tolerance. The microactuator suspension 30 should have an off track resonance frequency which is inside the bandwidth of the electrical signal to the motive element 42. The microactuator suspension 30 thus provides an off track resonance frequency less than 2000 Hz. Depending upon fabrication precision, the beam width tolerance may be about ±1 micron or ±2.5 microns, for example. The preferred beams 70 provide off track resonance frequencies between about 700 and 1400 Hz depending upon whether the beam 70 is at the upper end or lower end of the width tolerance.

A further feature of the microactuator beams 70 is that at the primary off track mode of the microactuator occurring at between about 700 hertz and 1400 hertz, the beams 70 allow the microactuator suspension 30 to act as mechanical low pass filter. As described above, the beams 70 are flexible in the x-direction to allow offtrack translation of the slider and micropositioning of the slider over a track on the disc. This same flexibility allowing offtrack translation also absorbs or attenuates some of the input disturbances from the disc drive transmitted by the slider suspension, which includes the head gimbal assembly, load beam, and actuator arm.

The slider suspension experiences a variety of input disturbances which may result in offtrack motion of the slider. For instance, it is well known that airflow in the disc drive enclosure exerts forces on the slider suspension. These forces, commonly called "windage" forces, have broad band frequency content. The windage forces can cause the slider suspension to vibrate to such an extent that the microactuator no longer has sufficient stroke to compensate for the disturbance. The beams 70 of the microactuator suspension 30 attenuate the windage disturbances, which provides the microactuator with sufficient stroke to compensate for windage disturbances at frequencies as high as 21 KHz.

Figure 5:
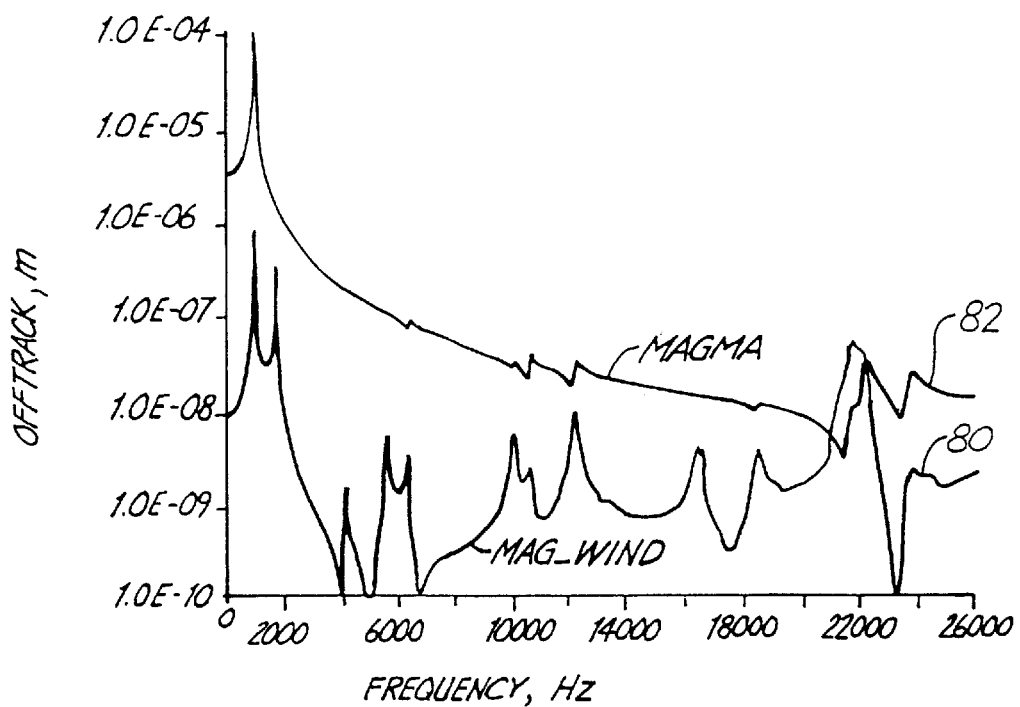
FIG. 5 is a graph illustrating the frequency response of the inventive microactuator to its drive signal and the frequency response of the suspension to the windage forces.

To illustrate this vibration attenuation feature of the microactuator suspension 30, FIG. 5 shows the results of modeling a slider suspension having a microactuator according to the present invention. The graph in FIG. 5 illustrates the results of modeling two system input disturbances, windage excitation forces and the response to the actuation force applied to the microactuator's magnet. The windage excitation forces are assumed constant at all frequencies, consistent with the broad band spectrum observed in disc drives. FIG. 5 shows the frequency response of the microactuator suspension 30 to the windage forces as curve 80 as well as the frequency response of the microactuator to its drive signal illustrated by curve 82. In contrast to the prior art, the microactuator 44 allows off track translation, but not rotation. The off track translation is allowed by the flexible beams 70, which also tend to absorb or attenuate the input disturbance from the suspension caused by the windage forces.

It is possible to design the silicon load beams of the microactuator for a specific resonance frequency. First, the offtrack stiffness is determined from the rotor mass and the desired resonance based on the following equation:

$$K=m(2\pi f)^2$$

where K is the offtrack stiffness in Newtons per meter; m is the rotor mass in milligrams, typically 4 mg; and f is the resonant frequency. For a typical resonant frequency of 1 kilohertz, K equals 158 N/m.

A well known equation for stiffness of 2 beams constrained against tip rotation is:

$$K=24EI/L^3=2Et(w/L)^3$$

where E is the elastic modulus of silicon, 130 Gpa; I is the moment of inertia of the beam, $I=tw^3/12$; L is the length of the silicon beam; t is the thickness of the silicon wafer, about 200 micrometers; and w is the width of the silicon beam. These equations can be combined to give:

$$w=L(k/2Et)^{1/3}=0.0145L$$

Thus, if the beam length is 1 millimeter, the beam width is 14.5 micrometers to obtain the target 1 kHz resonant frequency with a 4 mg rotor mass. The microactuator suspension 30 shown in FIG. 4 can thus be created to have a beam length of 1750 μm and a beam width of about 25 μm.

In comparison, prior art microactuator structures more readily transmit vibrations occurring in the slider suspension through to the slider, and thus the recording head. FIG. 6 is an illustration of prior art microactuator structure. Shown in FIG. 6 is the load beam 84, flex circuit 86, microactuator structure 88, and slider 12. The slider is attached to the microactuator structure 88, which is in turn attached to the flex circuit 86 supported by load beam 84.

FIG. 7 more clearly illustrates the prior art microactuator structure 88 and how it supports slider 12. The microactuator structure 88 comprises four beams 90, center pad 92, and diamond shaped cut out 94. The beams 90 extend from the center pad 92 across the cut out 94 and connect to the microactuator structure 88 at the four corners of cut out 94. The slider 12 is suspended from the center pad 92. When actuated, the center pad 92 can rotate relative to the microactuator structure 88, but can not translate.

FIG. 8 is a graphical illustration of the frequency response of the prior art suspension illustrated in FIGS. 5 and 6 to the same windage forces as modeled on the suspension having a microactuator according to the present invention.

In FIG. 8, the frequency in Hertz appears along the x-axis, while the distance off track in meters appears along the y-axis. The frequency response of the prior art suspension to the windage forces is illustrated by curve 102, while the frequency response of the microactuator to its drive signal is shown by the curve 104. Several resonance peaks 106 appear on the windage curve 102. Of particular importance are the resonance peaks 106 which appear at about 6 kilohertz and at about 12 kilohertz, which have an amplitude of about 0.1 microns of off track motion. These modeled peaks are consistent with experimental observation.

The frequency response of the microactuator to its drive signal as illustrated by curve 104 shows a resonance at about 1 kilohertz, followed by a smooth rolloff. This rolloff tends to reduce the stroke of the microactuator at high frequencies. As can be seen from the graph, the microactuator has insufficient stroke to compensate for the windage disturbance illustrated by the peaks 106 which occur at about 12 kilohertz.

When comparing FIG. 8 to FIG. 5, it can be seen that the windage disturbances experienced by the prior art device at the 6 and 12 kilohertz have been attenuated by about 20 decibels to 0.01 microns of off track motion. As is further illustrated by curve 82 in FIG. 5, the roll-off of the microactuator frequency response is not as smooth as that of the prior art, which may be due to the unbalanced reaction force exerted on the suspension by the microactuator. Though this unbalanced force excites some small suspension resonances near 11 and 12 kilohertz, a much more important aspect of the translating beam structure is the attenuation of the windage disturbance. As can be seen by FIG. 5, the inventive microactuator has sufficient stroke to compensate for the windage disturbance at frequencies as high as 21 kilohertz.

This improved stroke capability at high frequencies allows the translating beam structure to more closely follow a track with high servo bandwidth than the prior art wagon wheel design. Higher servo bandwidth allows the tracks to be placed closer together on the disc, thereby either increasing the disc drive data storage capacity, or reducing the disc count and overall drive costs. In addition, the demands on the suspension manufacture and design are not as severe when the presently inventive microactuator is attached between the suspension and the slider.

To further demonstrate the vibration attenuation effect of the microactuator suspension, the microactuator was modeled in two states. The first state comprised a microactuator that was locked by coupling the nodes between the rotor and the stator. The second state comprise removing these couplings, allowing the primary off track mode at 1 kilohertz to appear in the frequency response. The suspension load beams used when modeling these two states were 2.5 mils thick. In addition to the microactuator in the locked and free states, two load beam pre-load geometries were also modeled. An ideally formed load beam having a pre-load bend placed at 35 mils from the baseplate edge was modeled. In addition, a "damaged" suspension was modeled as having a bend at 50 mils from the baseplate edge. The bend angle was 8.5 degrees in both cases.

Figure 9:
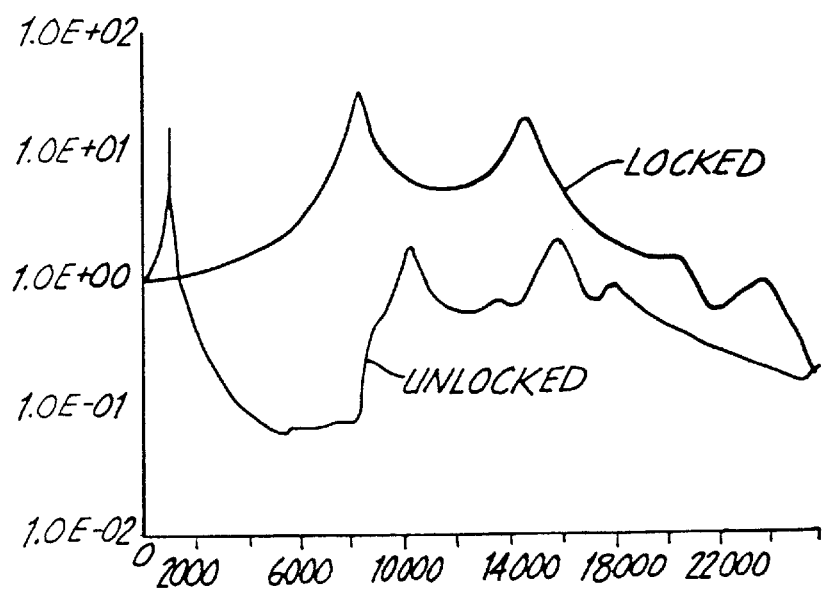
FIG. 9 is a graph illustrating the frequency response amplitude ratio of the recording head off track displacement to the off track displacement at the suspension baseplate when the microactuator is locked and when the microactuator is free to resonate.
Figure 10:
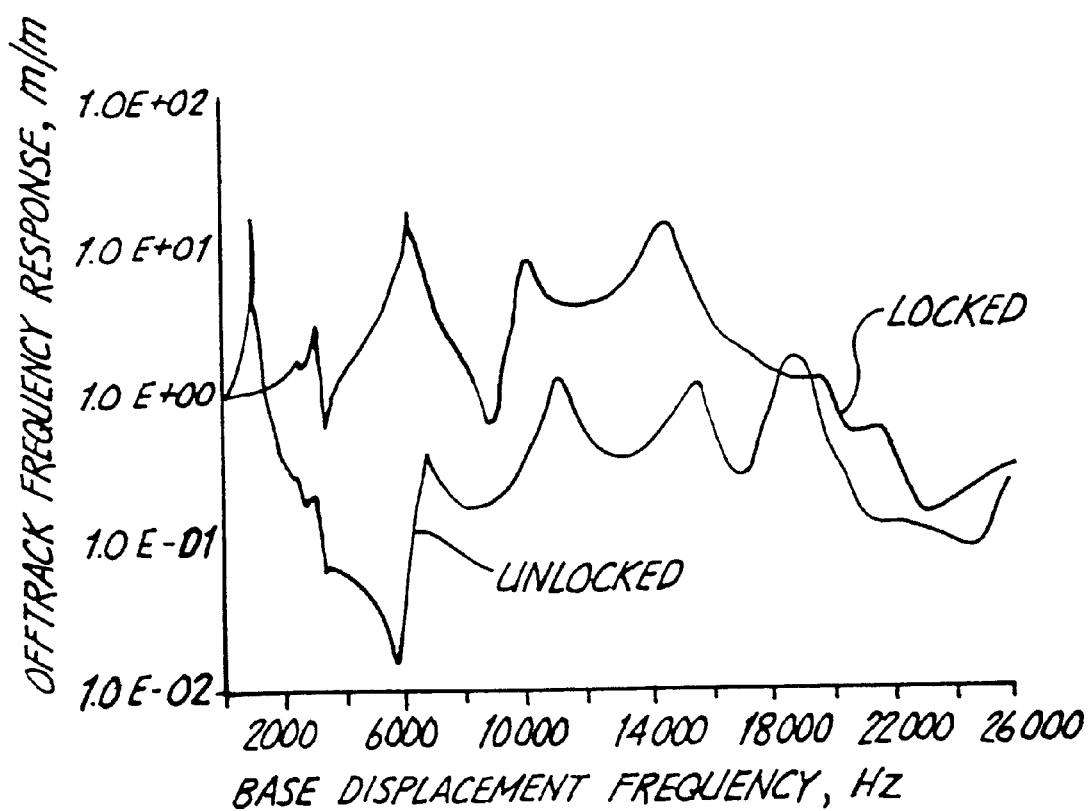
FIG. 10 is a graph illustrating the frequency response amplitude ratio of the recording head off track displacement to the off track displacement at the suspension baseplate for a damaged preloading geometry.

The results of these models are illustrated in FIGS. 9 and 10. Both FIGS. 9 and 10 show the frequency response amplitude ratio of the recording head off track displacement to the off track displacement at the suspension baseplate. The model assumed a uniform damping ratio of 3% at all frequencies. The attenuation effect of the low frequency mode in the presently inventive microactuator is shown in these graphs. An unexpected benefit is that the maximum microactuator resonance amplitude is only about 55% of the maximum non-microactuator amplitude (or a minus 5.2 decibel reduction from 29.8 decibels verses 24.6 decibels). The low amplitude of the microactuator is presumably due to the small spring mass of the slider compared to the entire load beam, gimbal, and slider mass in the non-microactuator case.

Illustrated in the table below are the resonances and the amplitudes of the ideally formed suspension. FIGS. 11–20 illustrate the mode shapes the suspension experiences at various frequencies. Specifically, FIG. 11 is a top view and FIG. 12 is a side view illustrating the microactuator mode at 1,018 hertz. Shown in FIG. 11 is the load beam 18, slider 24, gimbal 32, and microactuator 30. FIG. 11 illustrates how the flexible beams 70 of the microactuator suspension 30 allow the slider 24 to be moved relative to its resting position.

FIG. 13 is a top view and FIG. 14 is a side view illustrating the suspension 18, slider 24, gimbal 32 and microactuator 30 in the first torsion mode experienced at about 3,108 hertz. In the first torsion mode, the suspension 18 twists, as can be seen in FIG. 14.

FIG. 15 is a top view and FIG. 16 is a side view illustrating the suspension 18, slider 24, gimbal 32, and microactuator structure 30 in the load beam sway mode which occurs at 8,832 hertz. Dashed lines 18a, 32a provide an indication of the displacement of the suspension 18 and gimbal 32 during the load beam sway mode. FIG. 16 indicates that the suspension 18, as well as the gimbal 32, deform or twist during the sway mode.

FIG. 17 is a top view and FIG. 18 is a side view illustrating the suspension 18, slider 24, gimbal 32, and microactuator structure 30 in the second torsion mode which occurs at about 10,301 hertz. Once again, dashed lines 32a, 18a provide an indication of the displacement of the gimbal 32 and suspension 18 during the second torsion mode. Similar to the first torsion mode, the suspension 18 twists, as shown in FIG. 18, during the second torsion mode.

FIG. 19 is a top view and FIG. 20 is a side view illustrating the suspension 18, slider 24, gimbal 32, and microactuator structure 30 in the gimbal yawing mode experienced at about 15,809 hertz. Dashed lines 18a, 32a indicate the displacement of the gimbal 32 during the gimbal yawing mode. As can be seen in FIG. 20, the gimbal 32 deforms or twists during the gimbal yawing mode.

The mode shapes illustrated by FIGS. 11–20 are used in Tables 2 and 3 below. Table 2 compares the modal frequencies in hertz of a suspension having a magnetic microactuator ("MAGMA") with a suspension having no microactuator ("non-MAGMA"). Table 3 compares the baseplate disturbance amplitude ratios (m/m) of a slider suspension with a magnetic microactuator with a slider suspension having no microactuator.

TABLE 2

| | Modal Frequencies (Hz) | | | | |
|---|---|---|---|---|---|
| Design/ Mode | Micro- actuator | First Torsion | Load Beam Sway | Second Torsion | Gimbal Yawing |
| Non MAGMA | — | 3104 | 8367 | 9033 | 14634 |
| MAGMA | 1018 | 3108 | 8832 | 10301 | 15809 |

TABLE 3

| | Baseplate Disturbance Amplitude Ratios (m/m) | | | | |
|---|---|---|---|---|---|
| Design/ Mode | Micro- actuator | First Torsion | Load Beam Sway | Second Torsion | Gimbal Yawing |
| Non MAGMA | — | 1.26 | 31.0 | 13.4 | 18.6 |
| MAGMA | 17.0 | 0.14 | 0.24 | 1.82 | 2.03 |

In addition to vibration attenuation, the microactuator allows for fine positioning of the slider above a selected track on a disc. FIGS. 21 and 22 illustrate in detail a first embodiment of the microactuator of the present invention. As shown in FIG. 21, without any insulator/overcoat, each stator 60 of the preferred motive element 42 includes a yoke 172 with cores 174 fabricated within coils 176. The coils 176 are formed of an electrical conductor and have contacts 178. During operation of the microactuator 44, a current is induced on the coils 176 by an electrical signal placed on the contacts 178. The magnitude and direction of the current determines the magnitude and direction of the magnetic field generated by the stators 60, and the magnitude and direction of the generated magnetic field induces a microactuator force on the magnetically responsive element 62 on the slider attachment pad 56. The microactuator force causes deflection of the beams 70 and movement of the slider attachment pad 56 relative to the suspension arm attachment pad 58. The transducer or other communication element moves with the slider 24, and the slider 24 moves with the slider attachment pad 56. The controlled movement of the slider attachment pad 56 thus results in the desired microactuation. In response to a given microactuator force, the beams 70 control the amount of lateral translation of the slider attachment pad 56 as well as the amount and axis of any pivoting rotation of the slider attachment pad 56.

The spaced supporting arms 68 locate the attachment bridges 52 so the attachment bridges 52 are balanced relative to the gimbal point 54. The stator 60 is offset forward from the gimbal point 54.

Each slider attachment pad 56 attaches to a side surface 180 of the slider 24 rather than the top or back face 182. The preferred slider attachment pad 56 includes two side arms 184 which extend on opposing side surfaces 180 of the slider 24. Each side arm 184 of the slider attachment pad 56 includes a point contact 186 and an adhesive wicking area 188. For instance, the point contact 186 may extend inward about 5 to 50 microns, with a preferred extension of about 20 microns. This leaves an adhesive gap 190 which is nominally about 20 microns between the side arm 184 of the slider attachment pad 56 and the side surface of the slider 24. The slider 24 is adhesively secured to the slider attachment pad 56 by wicking adhesive such as epoxy into the adhesive gap 190.

A front butt-up section 192 extends laterally between the side arms 84 of the slider attachment pad 56. The leading face 194 of the slider 24 contacts the front butt-up section 192. The front butt-up section 192 ensures longitudinal alignment of the slider 24 relative to the slider attachment pad 56.

The side arms 184 of the slider attachment pad 56 are considerably wider in the x-direction than the beams 70, and the front butt-up section 192 is considerably wider in the y-direction than the beams 70. The slider attachment pad 56 as a whole is rigid in the x-direction compared to the beams 70, and specifically is sufficiently rigid to withstand the microactuator force without significant deflection between the tongue 66 and the side arms 184. However, the side arms 184 (and/or the front butt-up section 192) is still narrow enough to permit some deflection of the side arms 184 in the x-direction, thereby permitting a higher tolerance on the slider width. For instance, the side arms 184 and the front butt-up section 192 may be fabricated at a width of from about 30 to 80 microns, and a preferred width for the side arms 184 and the front butt-up section 192 is about 40 microns.

The width between the opposing point contacts 186 is equal to or less than the minimum slider width, such that the opposing point contacts 186 have a slight interference fit with the side surfaces 180 of the slider 24. In this way, the side arms 184 must be deflected slightly outward for the slider 24 to fit between them. The point contacts 186 preferably have an angled entry surface 196 to facilitate attachment by pressing the slider longitudinally forward between the side arms 184 and deflecting the side arms 184 outward. The point contacts 186 could alternatively have an entry surface which facilitates pressing the slider in the z-direction between the side arms 184, but the preferred orientation of the angled entry surface 196 is easier to fabricate on the microactuator suspension 30. The two side arms 184 act together as a clip to hold the slider 24 in place, each biasing inward with a clip force against the side surface 180 of the slider 24. In the preferred embodiment, the microactuator suspension 30 provides a nominal clip force of about 0.4 gmf.

While providing relative flexibility in the x-direction between the suspension arm attachment pad 58 and the slider attachment pad 56 for microactuation, the microactuator suspension 30 must support the preload and stiction forces applied to the slider 24. FIG. 22 reverses orientation of the y-direction from FIG. 21, and shows a side view of the microactuator suspension 30 attaching the slider 24 to the gimbal 32. Arrows 198 represent the preload force carried by the suspension arm attachment bridge 52 to the slider attachment pad 56. Arrows 200 represent the air bearing lift force on the slider 24. The profile of the hydro-dynamic lifting force is primarily dependent upon the shape of the air bearing surface of the slider 24, as well as the skew, pitch and roll angles of flying and the tangential velocity of the rotating disc 12. It is believed that the magnitude of the lift force is generally greatest at the leading edge and the trailing edge of the air bearing surface.

Air bearing surfaces are designed to provide a minimum flying height which is consistent at all flying radii on the disc 12. An "air bearing centroid" is defined as the location in the center of the air bearing surface of the slider 24 where the lift force profile can be most accurately approximated by a force at a single location and with no moment. The gimbal point is preferably at or near the air bearing centroid, and in the preferred embodiment both are represented by the crosshairs 54. The pitch and roll permitted by the gimbal 32 permit the slider 24 to fly at a more consistent minimum flying height, but the preload force must be balanced against the lift force and relative to the air bearing centroid 54.

The attachment bridge 52 of the present invention is balanced relative to the gimbal point and relative to the air bearing centroid. That is, the two attachment bridges 52 are equally spaced in the x-direction from the longitudinal axis, and each attachment bridge 52 is centered on the gimbal point/air bearing centroid 54 in the y-direction. Because the attachment bridge 52 is balanced relative to the gimbal point/air bearing centroid 54, stress due to the preload force is consistent throughout the entire area of each attachment bridge 52, and little or no moment force is transmitted through each attachment bridge 52.

The attachment bridges 52 preferably each extend longitudinally for a greater distance than their width. For instance, the attachment bridges 52 may have a length which is about 10 times their width. The two attachment bridges 52 are equally spaced on opposing sides of the longitudinal axis and the gimbal point 54. This shape and location of the attachment bridges 52 allows the attachment bridges 52 to take up minimal space on the footprint of the microactuator suspension 30 while still transmitting sufficient forces.

As best shown in FIG. 22, the microactuator suspension 30 is located at least in part within the height taken up by the slider 24, so the microactuator suspension 30 does not significantly add to the spacing required for the head gimbal assembly 16. The motive element 42 is preferably fabricated into the microactuator suspension 30, and does not significantly increase the thickness of the head gimbal assembly 16. That is, both the microactuator suspension 30 and the motive element 42 are located at least in part between the planes defined by the disc-opposing face 202 and the back face 182 of the slider 24. Disc drives 10 with the present microactuator suspension 30 can be made just as thin as without the microactuator 44.

Figure 23:
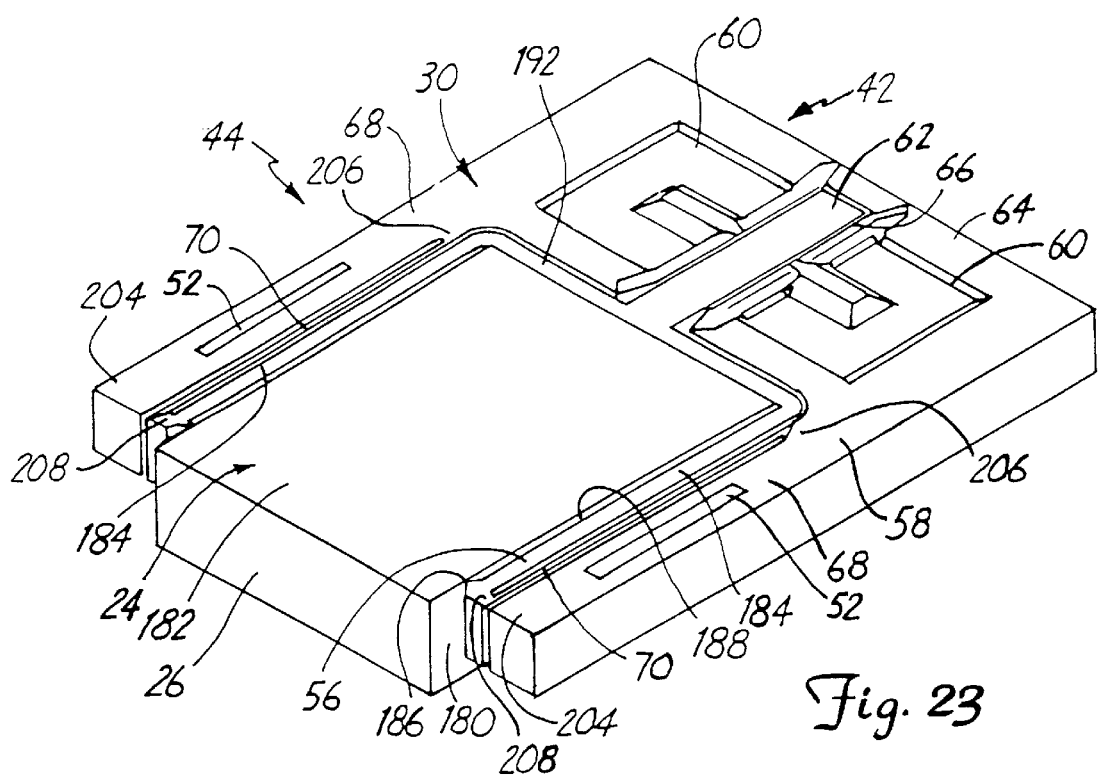
FIG. 23 is a perspective view of the embodiment of FIGS. 21 and 22.

As best shown in FIGS. 21 and 23, a deflection limiter 204 is provided on the suspension arm attachment pad 58 beyond each attachment bridge 52. With the deflection limiter 204, the overall outline of the microactuator suspension 30 and attached slider 24 is nearly rectangular. The trailing edge 26 of the slider 24 extends slightly or is exposed beyond the deflection limiter 204, making attachment of transducer leads 34 (shown in FIG. 2) easier. The beams 70 are located completely within outline provided by the relatively rigid suspension arm attachment pad 58, which helps in manufacturability. The deflection limiter 204 protects the beam 70 from bending too far, such as during assembly and during a potential stiction or crash event.

The ends 206, 208 of each beam 70 are generally equally spaced and balanced in the y-direction relative to the gimbal point 54, the pre-load force provided through the attachment bridges 52, and the lifting force of the slider 24. Because of this, the bending moment placed on the beam 70 due to the pre-load force is minimized. The highest stress concentrations in carrying the pre-load force are at the ends of the beams 70, but the magnitude of these stress concentrations is minimized. For instance, each beam 70 may be about 1000 microns long and be nominally about 11 or 12 microns wide. The attachment bridges 52 and gimbal point/air bearing centroid 54 are centered at a longitudinal location 500 microns from each beam end 206, 208.

Stiction loading primarily places a tensile stress on the beams. Stiction loading also induces a bending moment on the beam about an x axis, since the load is roughly at the air bearing surface of the slider (i.e., at the surface of the disc) while the central plane of the microactuator suspension is above the air bearing surface of the slider. Stiction and preload stresses tend to counteract each other at the leading end 206 of the beam 70, but accumulate at the trailing end 208 of the beam 70.

The relative tilt caused by the pre-load between the suspension arm attachment pad 58 and the slider attachment pad 56 is also minimized when the load point is halfway along the beam 70. Even if tilt is minimized, there will still be vertical deflection due to flexibility of the beam 70 in the z-direction. For instance, if the beams 70 are about 15 microns wide and about 750 microns long in a 200 micron thick single crystal silicon wafer, the vertical deflection due to a 4 gmf preload will be about 2 microns. If this vertical deflection is not compensated for in fabricating the motive element 42, it may be desirable to compensate for the vertical deflection to some degree by moving the beam 70 relative to the load points and inducing a pre-load tilt between the suspension arm attachment pad 58 and the slider attachment pad 56. With the 15×200×750 beams 70, placing the beams 70 so the attachment bridge 52 and gimbal point/air bearing centroid 54 are at 60% of the beam length will induce a tilt which will generally compensate for the vertical deflection, leaving the tongue 66 generally at the same height with the suspension arm attachment pad 58 for alignment between the magnetically responsive element 62 and the stator 60.

Figure 24:
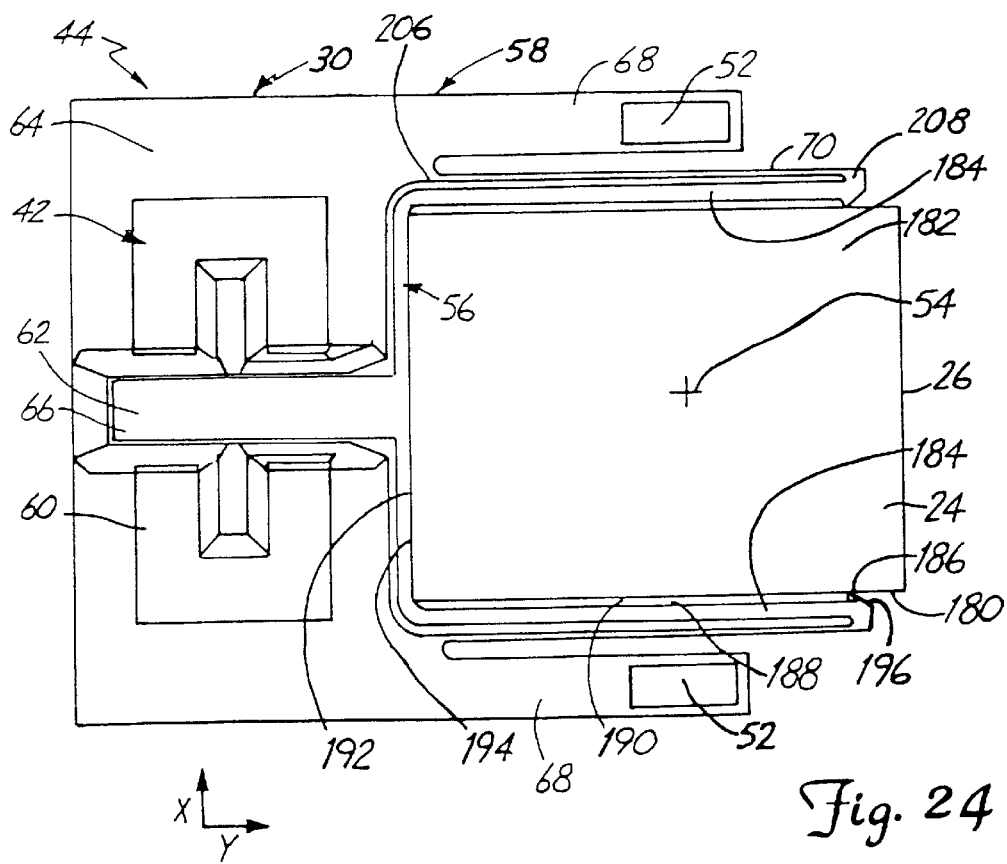
FIG. 24 is a plan view of the microactuator suspension, motive element and slider of a second embodiment of the invention.
Figure 25:
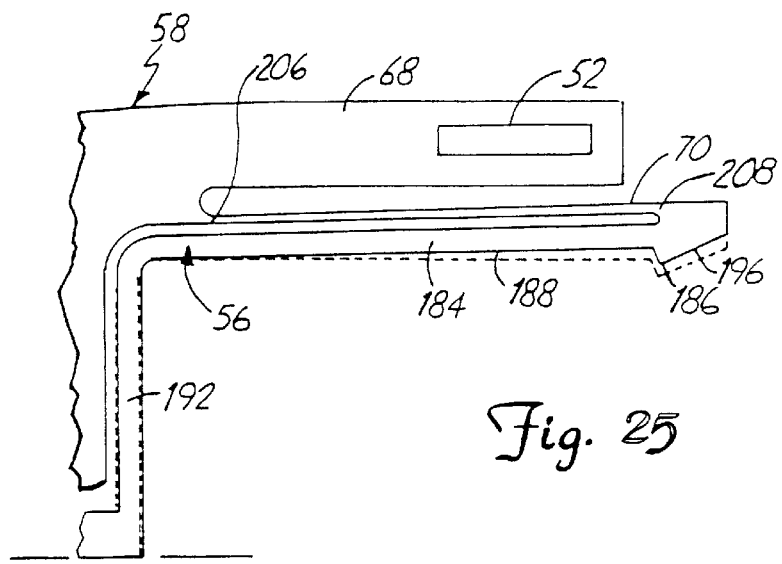
FIG. 25 is a plan view of a portion of the microactuator suspension of FIG. 24, showing deflection due to clipping of the microactuator suspension at an upper tolerance slider width.

FIGS. 24 and 25 show another embodiment of the invention. In this embodiment, the spaced supporting arms 68 do not extend quite as far, but terminate at trailing ends of the attachment bridges 52. As in the first embodiment, the ends 206, 208 of each beam 70 in the microactuator suspension 30 of FIGS. 24 and 25 are longitudinally spaced on opposite sides of the gimbal point/air bearing centroid 54 and on opposite sides of the attachment bridges 52, which minimizes pre-load stress concentrations in an identical fashion to the first embodiment. Microactuation occurs in the embodiment of FIGS. 24 and 25 in the same way as in the embodiment of FIGS. 21–23, with a microactuation force which is generated to move the slider attachment pad 56 relative to the suspension arm attachment pad 58. The microactuator suspension 30 of FIGS. 24 and 25 does not provide an overall rectangular outline, and the point contacts 186 and the ends 208 where the beams 70 join the slider attachment pad 56 are not protected by a deflection limiter.

During manufacture of the slider 24, there is a significant tolerance associated with the width of the slider 24. For instance, the slider width may have a tolerance of plus or minus about 12 microns. The width of the side arms 184 and the front butt-up section 192 may have a smaller etching tolerance, such as plus or minus 2.5 microns on a 200 micron thick wafer. It is not known during fabrication of the microactuator suspension 30 whether the microactuator suspension 30 will be used with a slider width at the top end of the tolerance or the bottom end of the tolerance. At the bottom end of the tolerances, deflection of the side arms 184 may be minimal, such as a minimal deflection of about 1 micron and providing a minimum clip force of only about 0.1 gmf. At the upper end of the tolerance, deflection of the side arms 184 is larger, such as a maximum deflection of about 15 microns and providing a maximum clip force of about 0.7 gmf. FIG. 25 omits the slider 24 for clarity and includes dashed lines showing deflection of the side arms 184 associated with spreading the point contacts 186 to the upper end of the slider width tolerance. The deflection of the slider attachment pad 56 preferably occurs in the front butt-up section 192 as well as in the side arms 184.

The adhesive wicking area 188 keeps the slider attachment pad 56 from contacting the side faces 180 of the slider 24 other than at the point contacts 186. Accordingly, even though the slider width is greater than the width of the front butt-up section 192 in the x-direction, the side arms 184 still do not contact the side faces 180 of the slider 24. High localized stresses, which could be created by contact between the leading corners of a wide slider and the side arms 184 of the slider attachment pad 56, are avoided. In the preferred embodiment, even with a slider width at the upper width tolerance limit, localized stresses are maintained no greater than about 50 MPa, occurring at the corner where the front butt-up section 192 joins the side arm 184.

In addition to stressing the side arm 184, upper slider widths also stress the beam 70 similar to actuation. In the preferred embodiment, a slider width at the upper width tolerance limit provides a maximum localized beam stress of about 38 MPa. In general, the slider width tolerance stresses the beam 70 because the end 208 of each beam 70 attaches to the side arm 184 at a longitudinal location very close to the point contact 186. If desired, stress on the beam 70 due to differing slider widths can be avoided or minimized by reversing the orientation of the beams 70. That is, the beams can be oriented with the beam end on the slider attachment pad 56 toward the leading end of the microactuator suspension 30 and the beam end on the suspension arm attachment pad 58 joining the trailing end of the spaced supporting arm 68 or the deflection limiter 204. With such a reversed beam orientation, the beam end attaching to the side arm 184 is longitudinally spaced from the point contact 186 by the length of the side arm 184, and bending of the side arm 184 does not stress the beam. However, reversing beam orientation modifies the tilt characteristics between the slider attachment pad 56 and the suspension arm attachment pad 58.

Figure 26:
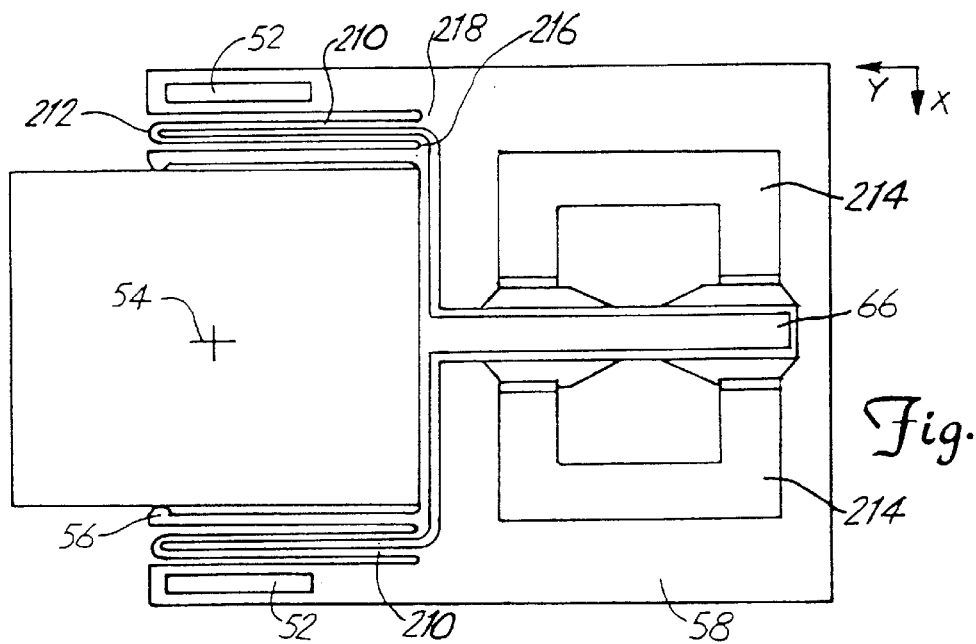
FIG. 26 is a plan view of a microactuator suspension, motive element and slider of a third embodiment of the present invention.
Figure 27:
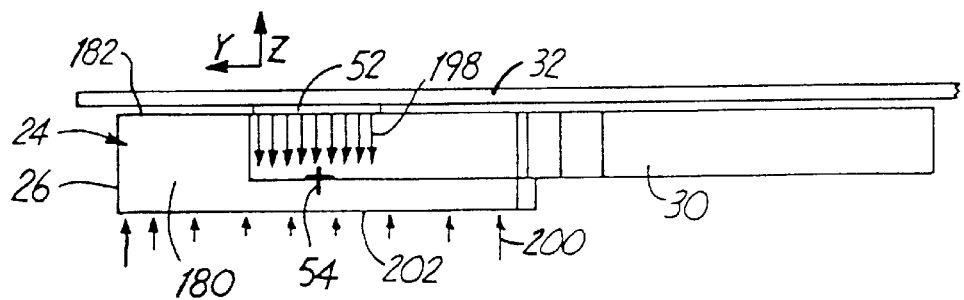
FIG. 27 is a side view of FIG. 26.
Figure 28:
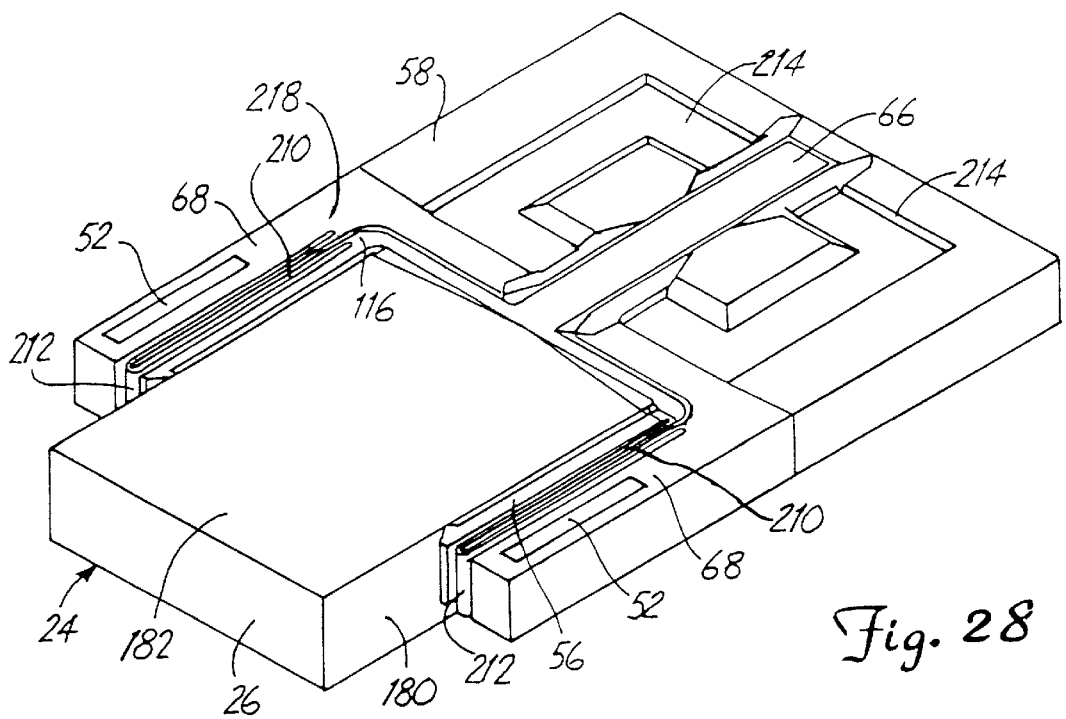
FIG. 28 is a perspective view of the embodiment of FIGS. 26 and 27.

FIGS. 26–28 show an alternative embodiment utilizing a different resilient support construction. In this construction, the resilient support is a dual beam 210 which reverses at a bend 212. Microactuation occurs in the embodiment of FIGS. 26–28 in the same way as in previous embodiments, with a microactuation force which is generated to move the slider attachment pad 56 relative to the suspension arm attachment pad 58. The dual beam 210 provides additional lateral flexibility in a shorter overall beam length. With the shorter overall beam length, more space is available for the stator 214.

The dual beam 210 attaches to the slider attachment pad 56 with a beam end 216 at the same longitudinal position as the opposite beam end 218 attaches to the suspension arm attachment pad 58. Thus, both the attachment bridge 52 and the gimbal point/air bearing centroid 54 are cantilevered in the same general direction from both beam ends 216, 218. Both beam ends 216, 218 can be positioned at the same longitudinal location as one of the beam ends 306 from the previous embodiments, with each beam end 216, 218 being the same longitudinal distance from the attachment bridge 52 and from the gimbal point/air bearing centroid 54 as the previous embodiments. With the dual beam 210 so located, the magnitude of the localized stresses in the beam 210 due to the pre-load force are the same as in the previous embodiment. However, in the preferred embodiment, the dual beam 210 is longitudinally positioned so the preload is at about 80 to 90%, and most preferably at about 88% of the beam length. As discussed previously with positioning the single beam so the pre-load is at 60% of the beam length, positioning of the dual beam 210 so the pre-load is at 88% of the beam length allows the tilt between the slider attachment pad 56 and the suspension arm attachment pad 58 to compensate for the vertical deflection of the pre-load.

In the dual beam configuration of FIGS. 26–28, the slider width tolerance does not add stress to the dual beam 210. The beam ends 216 remain at the same transverse position regardless of whether the slider 24 is at the upper or lower end of the slider width tolerance.

With the dual beam 210, the ends 216, 218 of each beam are at different transverse locations, i.e., spaced from each other in the x-direction. With the different transverse locations of beam ends 216, 218, there are torsion effects on the dual beam 210 in supporting the pre-load which contribute to localized stresses within the dual beam 210.

With the preferred dual beam design, the attachment bridge 52 extends to the longitudinal location of the bend 212, and the microactuator suspension 30 has an overall rectangular profile. Because both beam ends 216, 218 are well forward of the attachment bridge 52, the limit on deflection is provided by the arm 68 for the attachment bridge 52, and no deflection limiter extending beyond the attachment bridge 52 is necessary.

If desired, the orientation of the dual beam 210 may be reversed from that shown in FIGS. 26–28, which places the longitudinal location of the beam ends very close to the longitudinal location of the attachment bridge 52 and the longitudinal location of the gimbal point/air bearing centroid 54. With the orientation of the dual beam 210 reversed, the dual beam 210 will be stressed due to differing slider widths.

Figure 29:
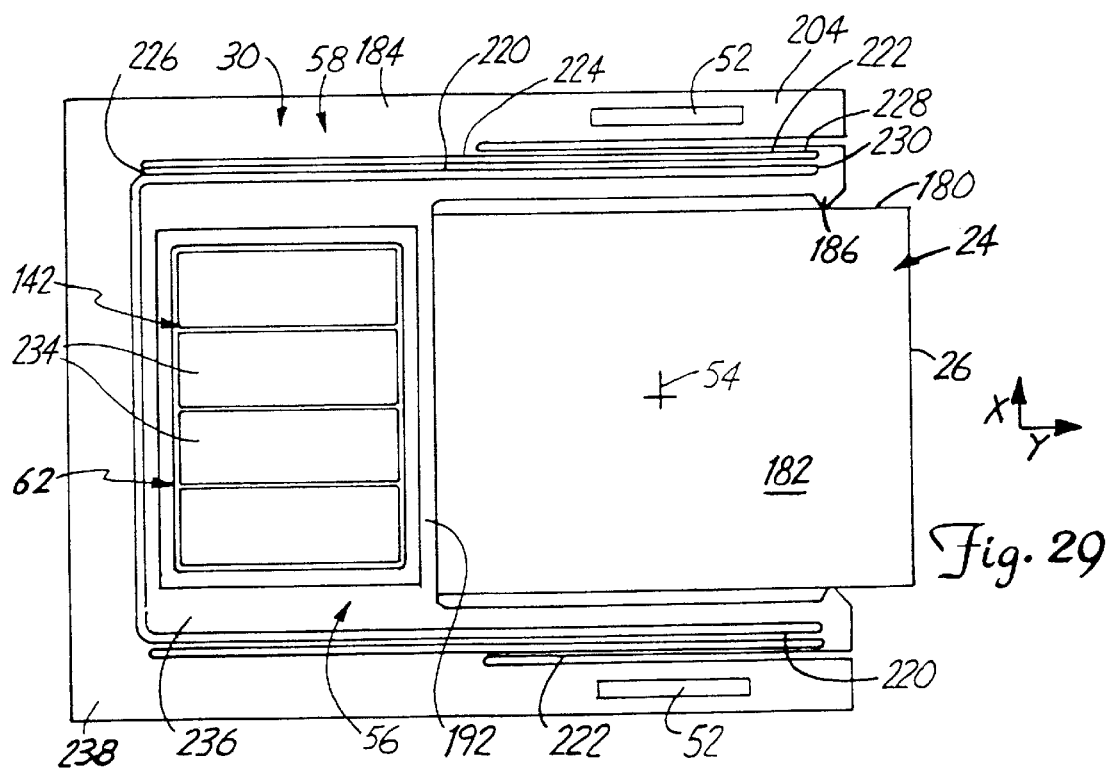
FIG. 29 is a plan view of a microactuator suspension, motive element and slider of a fourth embodiment of the present invention.

FIG. 29 shows another embodiment of the present invention. In FIG. 29, two beams 220, 222 are used having different lengths and different beam widths. In the preferred design, the ratio between short beam width and long beam width is the same as the ratio between short beam length and long beam length. For example, the long beam 220 may be 16 microns wide, and the short beam 222 may be 50% of the long beam width or 8 microns wide. The long beam 220 may be 1730 microns long, and the short beam 222 may be 50% of the long beam length or 865 microns long. The short beam 222 and the long beam 220 are preferably parallel to each other.

With the design of FIG. 29, the leading end 224 of the short beam 222 is longitudinally offset from the leading end 226 of the long beam 220. With at least one set of ends (i.e., either ends 224 and 226, or ends 228 and 230) of the two beams 220, 222 longitudinally offset, the multiple beams 220, 222 increase rotational stiffness of the microactuator suspension 30, so the slider 24 moves almost entirely in lateral displacement in response to the microactuator force on the slider attachment pad 56 with minimal pivoting. The use of different length beams 220, 222 with different thicknesses and having ends 224, 226 longitudinally offset from each other adds flexibility to the designer in controlling the movement of the slider attachment pad 56 relative to the suspension arm attachment pad 58.

The microactuator suspension 30 of FIG. 29 provides a rectangular outer profile, again with the trailing face 26 of the slider 24 extending slightly for access to the transducer leads 34 (shown in FIG. 2). With the significant length of the long beam 220, the leading end 226 of the long beam 220 is necessarily a significant distance from the gimbal point/air bearing centroid 54 and from the attachment bridge 52. The highest moment induced by the preload force occurs at the leading end 226 of the long beam 220. The increased thickness of the long beam 220 is necessary to enable the long beam 220 to withstand the localized stress of the preload force.

In the embodiment of FIG. 29, microactuation generally occurs in the same way as previously described, with a microactuation force which is generated to move the slider attachment pad 56 relative to the suspension arm attachment pad 58. However, the microactuator suspension 30 design in FIG. 12 utilizes a different type of motive element 42. As disclosed in co-pending application Ser. No. 09/315,006 filed May 10, 1999, entitled "Magnetic Microactuator," which is incorporated herein by reference, a magnetically responsive element 62 includes a plurality of magnet members 234 having differing magnetic orientations. A coil element (not shown) which produces a controlled magnetic field is displaced above the magnetically responsive element 62. The magnetic field produced biases the magnetically responsive element 62 at least partially in the x-direction, with a biasing force magnitude which varies depending upon the current driven through the coil.

With the magnet members 234, a motor section 236 is considerably wider than the tongue portion 66 in previous embodiments. The front butt-up section 192 is substantially rigid, and deflection of the side arms 184 due to a wide slider width does not correspondingly bend the front butt-up section 192. The side arms 184 in the embodiment of FIG. 29 must be flexible enough to withstand the entire slider width tolerance. The clip force is obtained entirely due to bending of the side arms 184 and beams 220, 222, whereas in previous embodiments bending of the front butt-up section 192 contributed to the clip force.

The long beam 220 is preferably located immediately inside the short beam 222. With the wide motor section 236, the rigidity of the suspension arm attachment pad 58 is provided by a frame portion 238 which is outside the long beam 220.

In the preferred geometry, the short beam 222 and the long beam 220 have trailing ends 228, 230 which terminate at the same longitudinal location, which also corresponds with the longitudinal location of the point contact 86. A slider width at the upper end of the tolerance will accordingly stress the beams 220, 222.

Figure 30:
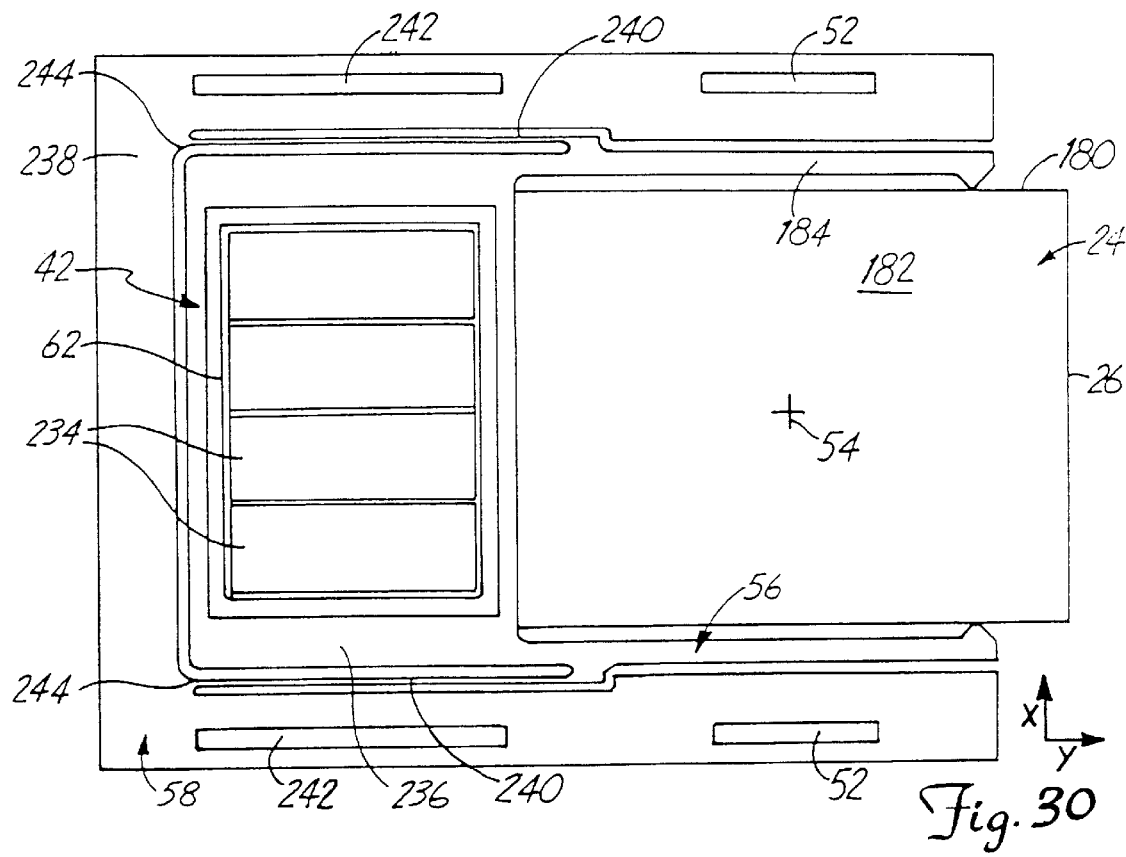
FIG. 30 is a plan view of a microactuator suspension, motive element and slider of a fifth embodiment of the present invention.

FIG. 30 shows another alternative embodiment, utilizing the magnet members 234 and motor section 236. In the embodiment of FIG. 30, a single beam 240 is fairly short, such as about 840 microns. The single beam 240 is moved forward in its longitudinal position. An additional attachment bridge 242 to the gimbal 32 (shown in FIG. 3) is provided. Microactuation occurs in the embodiment of FIG. 30 in the same way as previously described, with a microactuation force which is generated to move the slider attachment pad 56 relative to the suspension arm attachment pad 58.

The resilient support design of FIG. 30 is useful when a small preload force is possible with the slider 24, such as 0.35 gmf, while the microactuator force may be of the same order of magnitude as the preload force. In particular, a leading end 244 of the beam 240 is a significant longitudinal distance from the gimbal point/air bearing centroid 54, so even a small preload force will contribute a significant bending moment and significant stress at the leading end 244 of the beam 240. The beam 240 is balanced relative to the microactuator force on magnet members 234, so a comparatively large microactuator force (with components possibly in both the x and z-directions) will contribute minimal stress to the beam 240. Alternatively, if a larger preload force is required, the beam may made wider and lengthened, so as to have the same beam flexibility but have the beam connect at a mid-point of the side arm 184.

Figure 31:
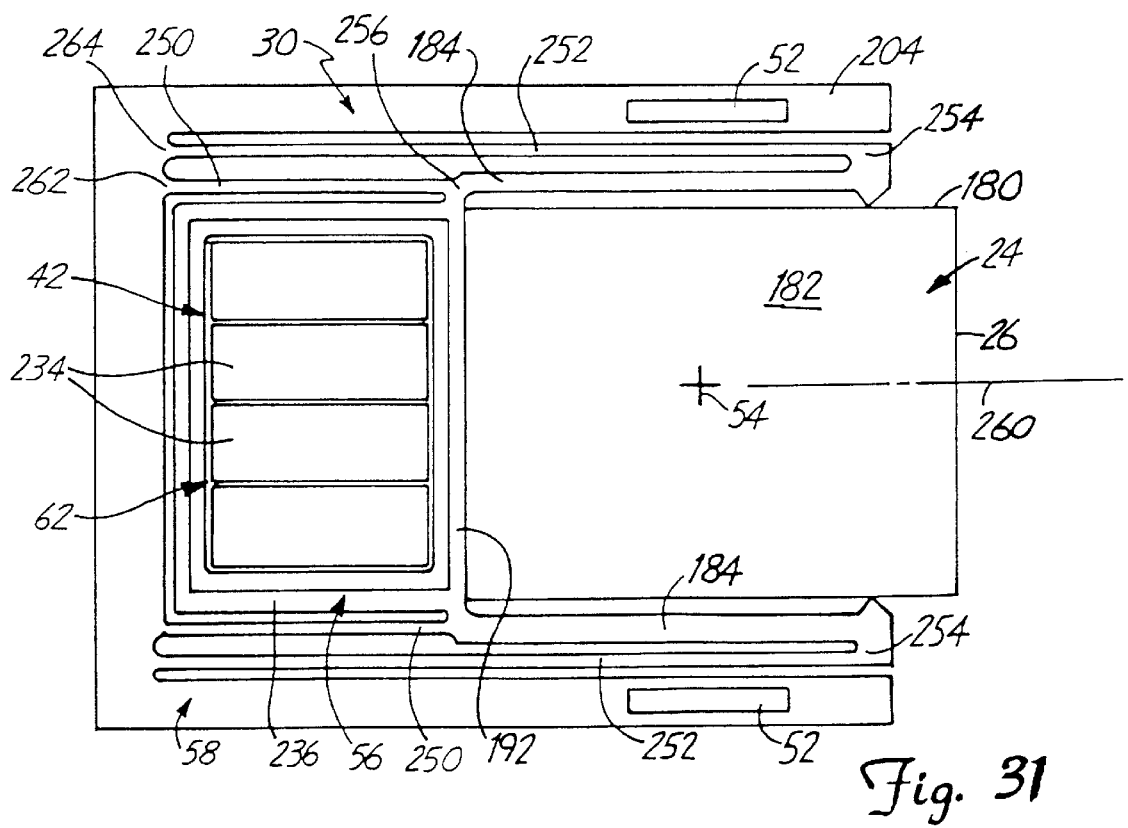
FIG. 31 is a plan view of a microactuator suspension, motive element and slider of a sixth embodiment of the present invention.

FIG. 31 shows an alternative embodiment of a microactuator suspension 30 used with the magnet members 234 and motor section 236. Microactuation occurs in the embodiment of FIG. 31 in the same way as previously described, with a microactuation force which is generated to move the slider attachment pad 56 relative to the suspension arm attachment pad 58.

The resilient support for the embodiment of FIG. 31 is in many respects similar to that of FIG. 29, but includes a short beam 250 toward the inside and a long beam 252 toward the outside. The long beam 252 connects to the side arm 184 at a trailing end 254, and flexing of the side arm 184 for upper slider widths (within tolerance) also flexes and adds stress to the long beam 252. In contrast, the short beam 250 connects to the side arm 184 at a trailing end 256 at the junction of the side arm 184 and the front butt-up section 192, and thus upper slider widths neither flex nor add stress to the short beam 250.

As previously described, the preload force generally applied at the air bearing centroid 54 tends to induce tilting of the slider attachment pad 56 relative to the suspension arm attachment pad 58. The trailing end 256 of the short beam 250 and the trailing end 254 of the long beam 252 are preferably both longitudinally spaced relative to the air bearing centroid 54. Because of this longitudinal spacing, the resilient support of FIG. 31 provides a high pitch stiffness and minimal motive element misalignment.

A leading end 262 of the short beam 250 and a leading end 264 of the long beam 252 are a significant longitudinal distance from the gimbal point/air bearing centroid 54. The resilient support design of FIG. 31 is particularly suited for relatively light preload forces, where the stress induced by the preload force at the leading ends 262, 264 will not exceed the material strength.

The relative amount of flexibility of the short beam 250 compared to the flexibility of the long beam 252 affects the system response. For instance, the short beam 250 and the long beam 252 may each be made the same width, with the short beam 250 being significantly stiffer than the long beam 252 due only to the difference in length. A preferred design has the short beam 250 being about 12 microns wide and about 800 microns long, and the long beam 252 being about 12 microns wide and about 1600 microns long. Other widths and lengths of beams will change the system response.

The microactuator force produced by the motive element 42 is not aligned relative to the gimbal point/air bearing centroid 54, but rather places a rotational moment on the slider attachment pad 56. The resilient support of FIG. 31 allows adaptability in design to address the rotational moment and minimize pivoting of the slider attachment pad 56 and attached slider 24. The flexibility of the beams 250, 252 can be selected as needed by changing the length and/or thickness of the beams 250, 252. Excess pivoting induces compressive/tensile loads in the beams 250, 252 (i.e., tending to lengthen the beams on one side of a longitudinal axis 260 and to shorten the beams on the other side of the longitudinal axis 160). The beam design of FIG. 31 thus limits the amount of pivoting provided during microactuation.

Figure 32:
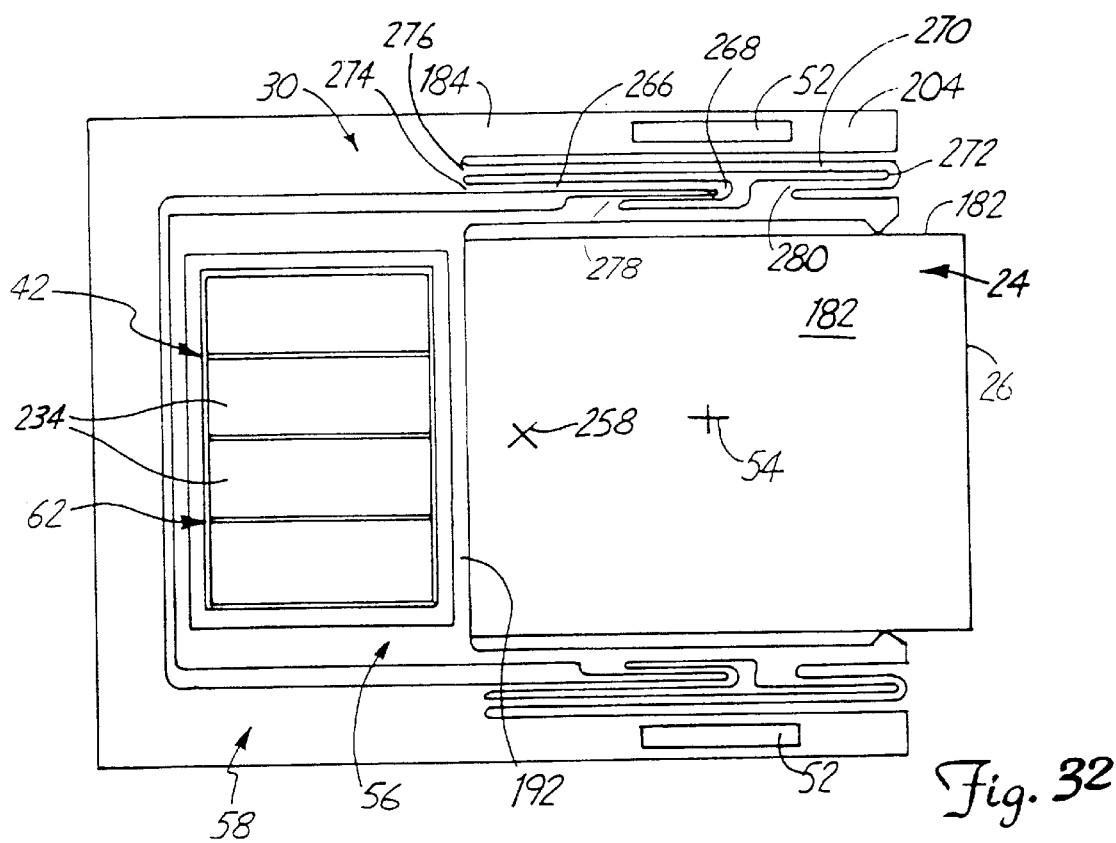
FIG. 32 is a plan view of a microactuator suspension, motive element and slider of a seventh embodiment of the present invention.

FIG. 32 shows an alternative embodiment for use when pivoting of the slider attachment pad 56 during microactuation is desired. In the embodiment of FIG. 32, a short beam 266 has a bend 268 and a long beam 270 has a bend 272. The bends 268, 272 induce significant pivoting of the slider attachment pad 56 about a microactuator pivot point 258. If beam flexibility is adequately selected, the microactuator force tends to pivot the slider attachment pad 56 about the microactuator pivot point 258 with minimal lateral translation.

The relative amount of flexibility of the short beam 266 compared to the flexibility of the long beam 270 controls the longitudinal location of the microactuator pivot point 258 and the amount of pivoting of the slider attachment pad 56 responsive to the rotational moment of the microactuator force. Adaptability of design is provided in the various stiffness parameters which can be controlled in the dual bend design of FIG. 32. In particular, each of the following parameters can be individually selected for the long beam 270 and individually selected for the short beam 266 to provide the desired system response to the microactuator, preload and stiction forces: (a) longitudinal location of a leading end 274, 276 of each beam 266,270; (b) longitudinal location of the bend 268, 272 in each beam 266, 270; (c) longitudinal location of a trailing end 278, 280 of each beam 266, 270, which, together with (a) and (b), controls the overall effective length of each beam 266, 270; (d) average width of each beam 266, 270, which, together with the overall effective length of each beam 266, 270, controls the spring constant and flexibility of the system; (e) width of each beam 266, 270 on the side of the bend 268, 272 toward the suspension arm attachment pad 58; and (f) width of each beam 266, 270 on the side of the bend 268, 272 toward the slider 24. In a preferred embodiment of FIG. 32, the width and length of the portion of the short beam 266 on the side of the bend 268 toward the slider 24 are respectively equal to the width and length of the portion of the long beam 270 on the side of the bend 272 toward the slider 24, and increased rotation about the microactuator pivot point 258 for a given microactuator force is achieved.

Figure 33:
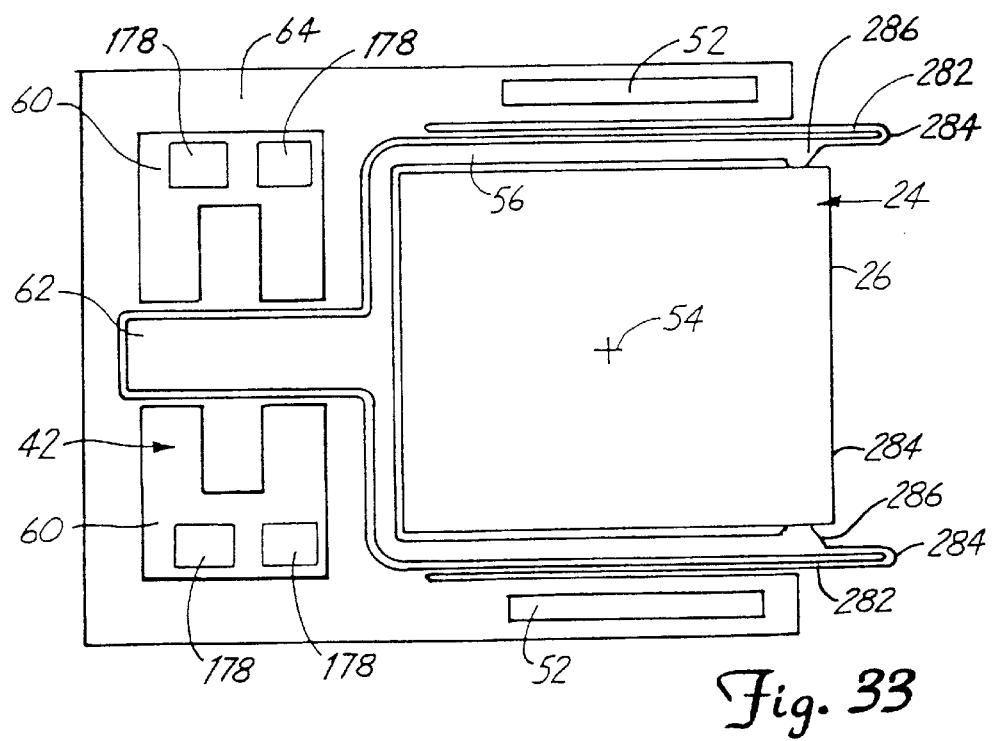
FIG. 33 is a plan view of a microactuator suspension, motive element and slider of an eighth embodiment of the present invention.

FIG. 33 shows an alternative embodiment where a long beam 282 is provided which does not extend into the stator pad portion 64. The long beam 282 has a bend 284 which extends beyond the trailing edge 26 of the slider 24. In contrast to the embodiment of FIGS. 26–28, a trailing end 286 of the long beam 282 attaches to the slider attachment pad 56 at a longitudinal location which is beyond the gimbal point/air bearing centroid 54. At the same time, the beam 282 does not interfere with fabrication of the stators 60.

Figure 36:
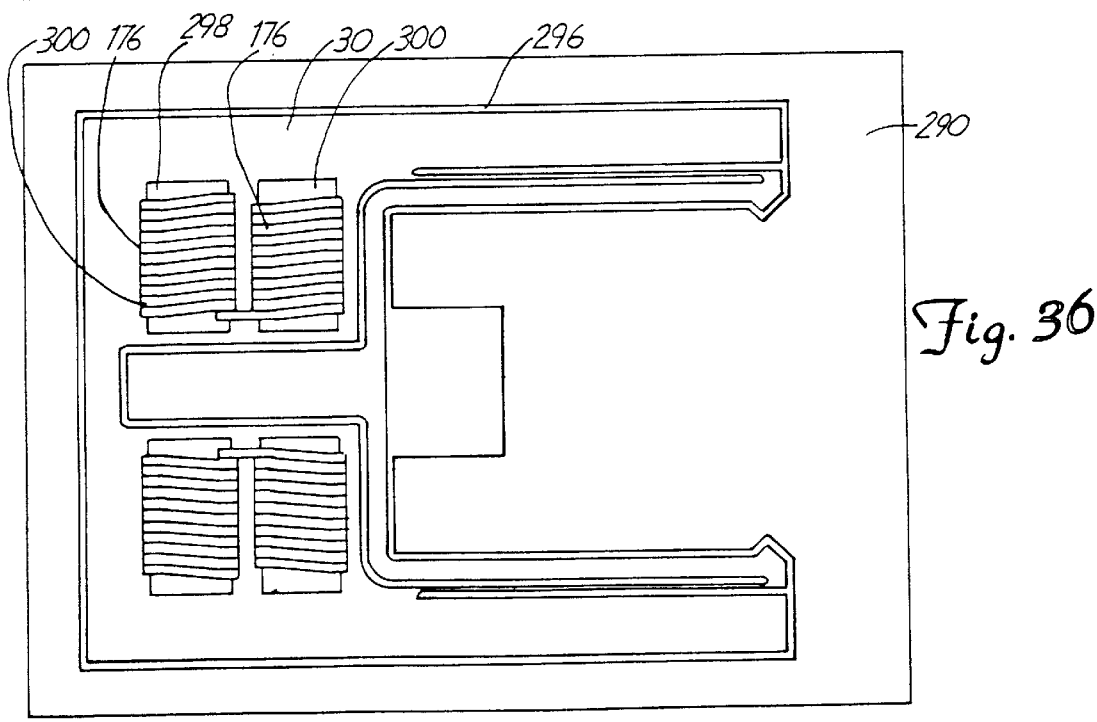
FIG. 36 is a plan view of the part, polymer fill and remaining wafer of FIG. 18 during subsequent fabrication of bottom portions of the coils.
Figure 37:
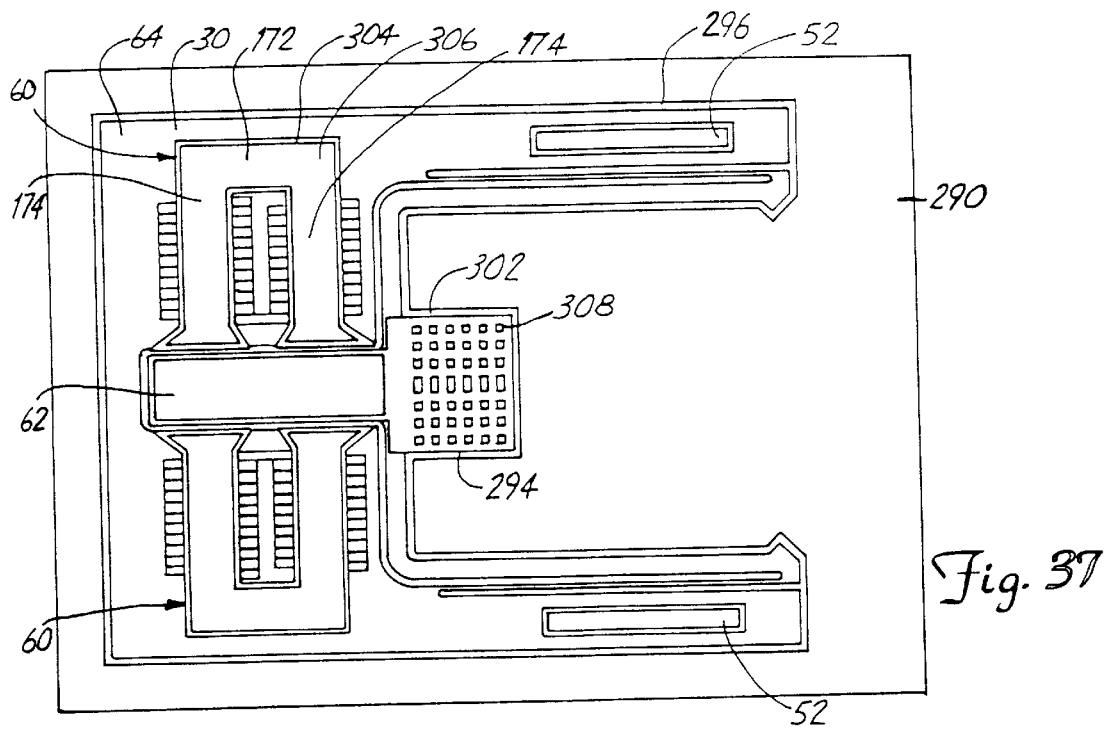
FIG. 37 is a plan view of the part, polymer fill and remaining wafer of FIG. 19 during subsequent fabrication of plating.
Figure 38:
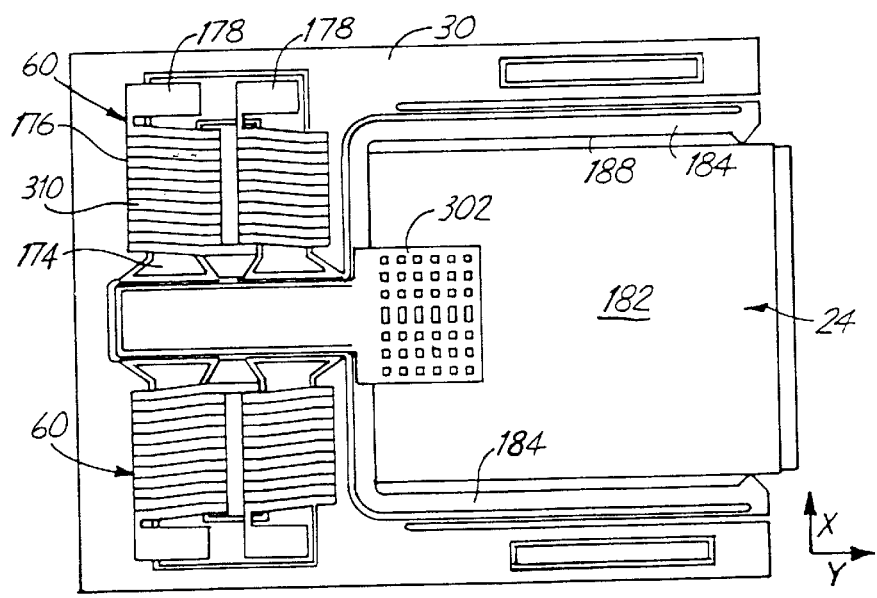
FIG. 38 is a plan view of the part of FIG. 37 shown with top portions of the coils and a slider.

FIGS. 34–38 illustrate a fabrication process for the microactuator suspension embodiment shown in FIG. 38. The microactuator suspension shown in FIG. 38 is similar to that shown in FIGS. 21–23, but further includes a slider bond pad 302.

Figure 34:
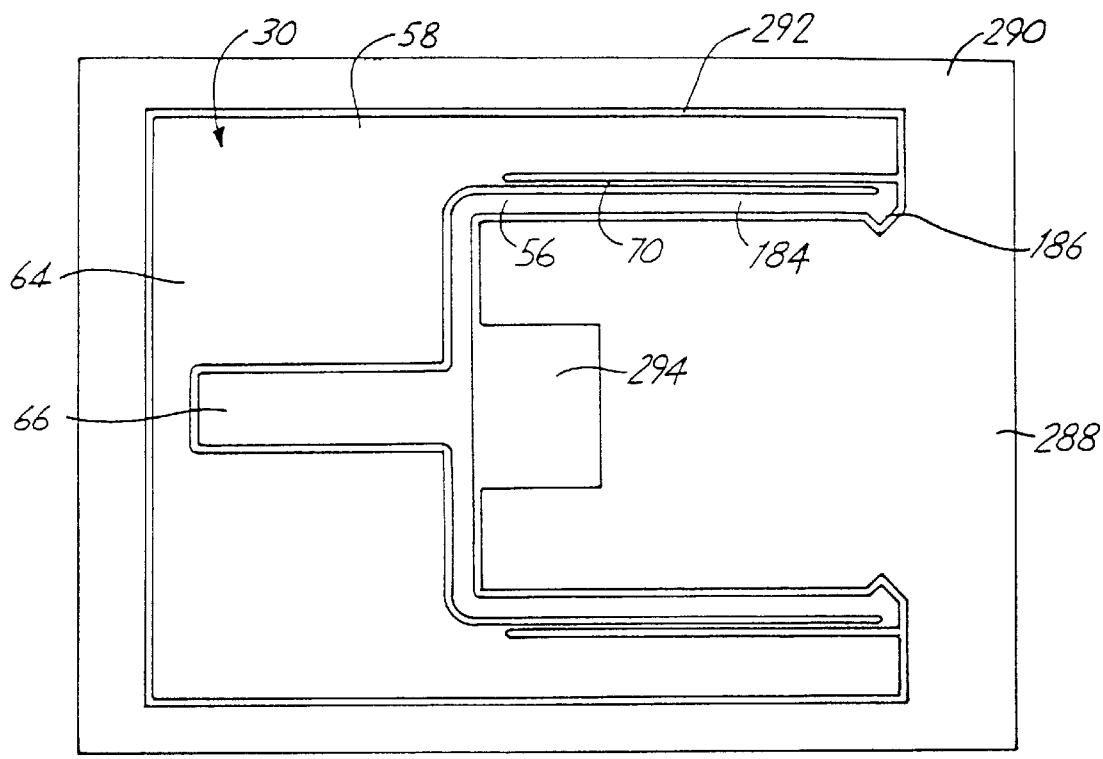
FIG. 34 is a plan view of a photolithographic mask profile.

FIG. 34 shows a deep trench reactive ion etch mask 288 which defines the geometry of the suspension arm attachment pad 58, the beam 70, and the slider attachment pad 56. The mask 288 individuates the part 30 from the remaining wafer 290 by defining an etch line or trench 292. If desired, a relatively large open area 294 is defined in a location which will be occupied by the slider 24. To the extent possible, the open area 294 is preferably positioned away from dimensionally critical features such as the side arms 184 and point contact 186. This open area 294 is provided for subsequent processing in forming the slider bond pad 302 (shown in FIGS. 37 and 38). Alternatively, for producing the microactuator suspension 30 of FIGS. 21–23, the mask 288 may omit the open area 294.

Other than the open etched area 294, a consistent trench width is preferably defined on the mask 288 between the part 30 and the remaining wafer 290. For instance, the trench 292 may be about 22 or 23 microns wide. The narrow trench 292 of uniform width serves two purposes. Narrow trenches reduce the chemical loading in the deep trench reactive ion etching chamber and therefore increases the etch rate. The uniform width of the trench 292 results in a consistent wall angle on the etched surfaces, because etchant is equally transported to and reactive species are equally transported from the uniform width trench 292. The consistent wall angle is desired to maintain the edges of the wafer substrate as vertical as possible in defining the beams 70 and the airgap separation between the tongue portion 66 and the stator pad portion 64.

A wafer (not independently shown) of appropriate material and thickness is fabricated, such as a wafer of 200, 250 or 200 micron thickness. Protective photoresist is photolithographically applied to the wafer with the mask 288 of FIG. 34. The wafer may be held to a backing substrate (not independently shown) by a thin film of silicon dioxide for example, which holds both the part 30 and the remaining wafer 290. With the mask 288 of FIG. 34 applied, a deep trench reactive ion etch is performed such as in a Sulfur Hexafluoride plasma with the plasma pressure and power optimized for the wafer material.

Figure 35:
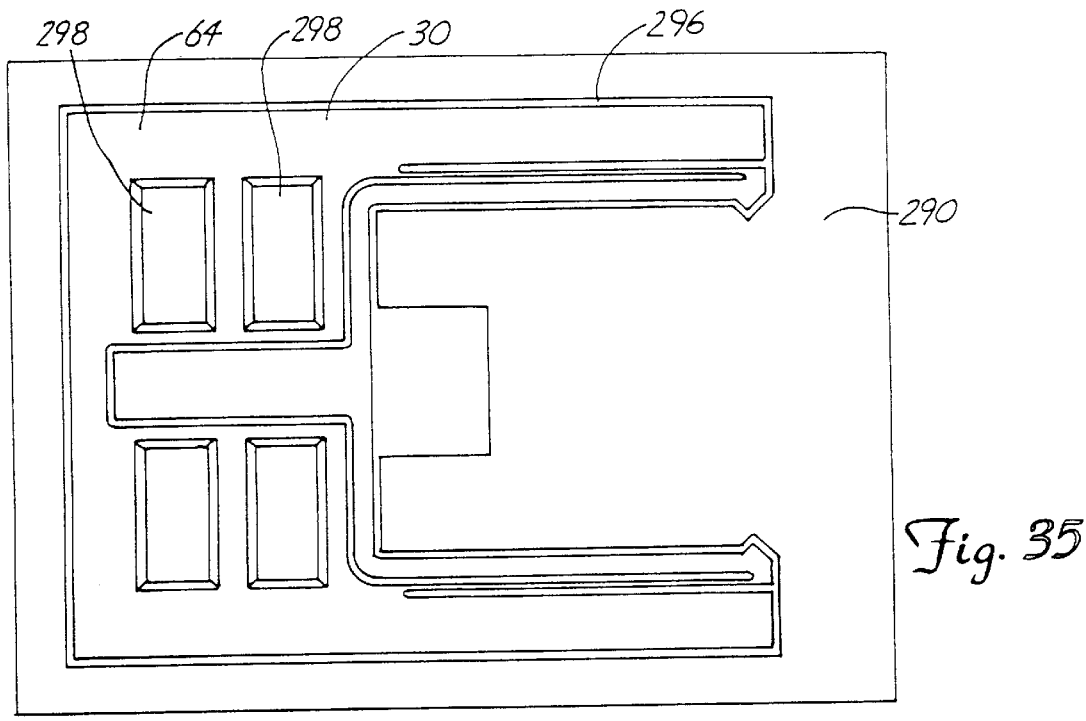
FIG. 35 is a plan view of a part, polymer fill and remaining wafer produced from the mask of FIG. 17 during subsequent fabrication of coil tubs.

After performing the etch, the trench 292 and the open area 294 are preferably filled with a temporary fill material 296 shown in FIG. 35. The temporary fill material 296 may be a polymer material such as polyimide. The temporary fill material 296 fills the trench 292 to provide a flat surface profile for subsequent processing of the stators 60 and magnetically responsive element 62.

FIG. 35 shows the part 30, temporary fill 296 and remaining wafer 290 with rectangular coil tubs 298 which are defined into the stator pad portion 64. For instance, the rectangular coil tubs 298 may be wet etched into the stator pad portion 64 with potassium hydroxide (KOH). One advantage of rectangular tubs 298 is that all of the corners are at right angles. The KOH etching process rate depends on the angles at the corners, and complex mask designs which do not follow the final desired profile are required for non-rectangular tubs.

FIG. 36 shows plating of a bottom portion 200 of the coils 176. The coils 176 are preferably formed of a conductive metal, such as copper. The coils 176 are preferably photolithographically defined through either an additive or subtractive process. The rectangular shape of the coil tubs 298 does not adversely affect the number of coils 176 packaged, and the coils 176 may extend quite nearly full length of the tubs 298. Interconnect portions of the coils 176 preferably extend outside the coil tubs 298. The temporary fill material 296 is preferably in place prior to any plating, however, the etching of the coil tubs 298 and/or the plating of the bottom portion 300 of the coils 176 may alternatively be performed before filling the trench 292 and open area 294 with temporary fill material 296.

FIG. 37 shows plating to define the cores 174 and the yokes 172 of the stators 60, the magnetically responsive element 62, the attachment bridges 52, and a slider bond pad 302. The plating of the cores 174, yokes 172 and magnetically responsive element 62 is with a ferromagnetic material such as a nickel-iron alloy which may be about 50 microns thick. The cores 174 and particularly the yokes 172 may extend over the stator pad portion 64 outside the tubs 298. In this way, the spacing between the cores 174 and the magnetically responsive element 62 can be very carefully minimized, while the walls of the tubs 298 need not be overly thin. The attachment bridges 52 and the slider bond pad 302 may be formed of the same material as the cores 174 and yokes 172 to reduce processing steps.

If desired, the cores 174 and yokes 172 of FIG. 37 may be deposited in two steps. In the first step, ferromagnetic material is deposited in a lower layer 304 which defines precise airgaps between the magnetically responsive element 62 and the cores 174. In the second step, ferromagnetic material is deposited in an upper layer 306 which covers most of the lower layer 304 but is slightly narrower than the lower layer 304. By using a two-step ferromagnetic plating process, the depth of photoresist defining the upper ferromagnetic layer 306 can be reduced, ensuring full exposure at the bottom of the resist. By ensuring full exposure at the bottom of the resist, the possibility over forming air bubbles on an overhung edge of underexposed photoresist is avoided.

The slider bond pad 302 extends over the area 294 of temporary fill material 296. An array 308 of holes is provided in the slider bond pad 302. After the plating shown in FIG. 37 is completed, the temporary fill material 296 may be dissolved or otherwise removed such as with an oxygen plasma. The array 308 of holes allows oxygen plasma to penetrate beneath the bond pad 302 and burn the temporary fill material 296 out of the open area 294.

FIG. 38 shows the completed assembly with the slider 24 installed between the side arms 184. Top portions 310 of the coils 176 with contacts 78 are fabricated over the cores 174. The slider 24 is positioned against the slider bond pad 302, aligning the slider 24 to the microactuator suspension 30 in the z-direction. In addition to the clip force and the adhesive wicking area 188, adhesive such as epoxy may be used to attach the back or top surface 82 of the slider 24 to the slider bond pad 302.

An insulator layer (not shown in FIG. 38) may be spun and baked over the coils 176. The insulator layer protects against electrical short, and the insulator layer should be a dielectric material. The insulator layer need not be highly thermally insulative, as it is preferred to readily dissipate heat from the coils 176. For instance, an alumina layer of about 10 micron thickness may be placed over the coils 176. In the preferred two-step ferromagnetic plating process, no air bubbles are created to expand during the insulator spin and bake process, which could otherwise ruin the insulator. An overcoat (not shown in FIG. 38) may also be deposited to physically protect the microactuator suspension 30 and/or the stators 60. Any insulator layer/overcoat is preferably fabricated prior to attachment of the slider 24 to the microactuator suspension 30.

Figure 39:
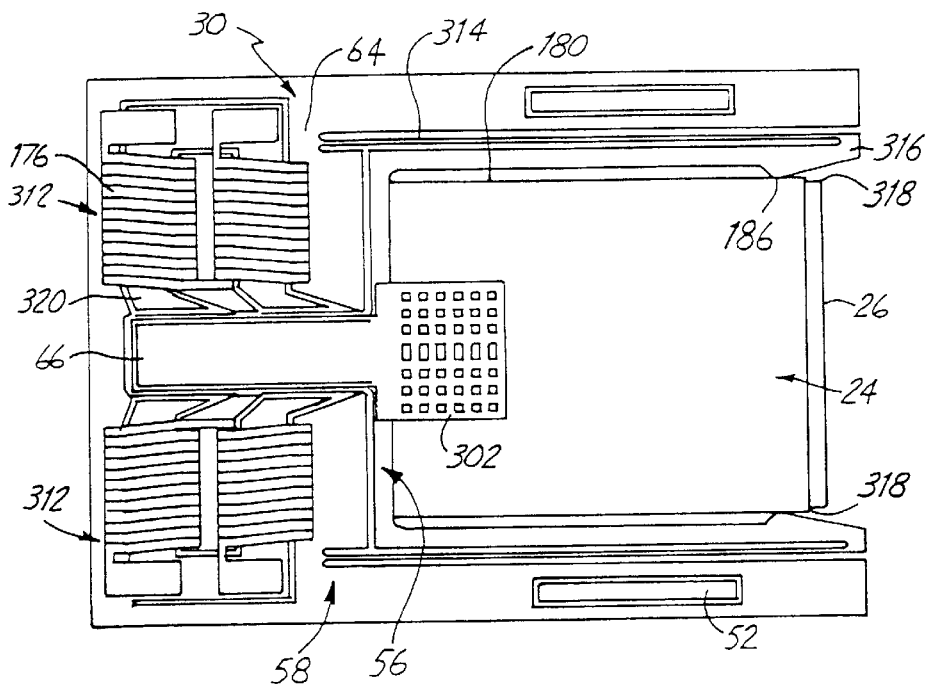
FIG. 39 is a plan view of a microactuator suspension and slider with an alternative embodiment of a stator.

FIG. 39 shows an alternative resilient support and stator 312. Microactuation occurs in the embodiment of FIG. 39 in the same way as previously described, with a microactuation force which is generated to move the slider attachment pad 56 relative to the suspension arm attachment pad 58.

A longer beam 314 extends into the stator pad portion 64. For example, the beam 314 may be about 1500 microns long, making the beam 314 only about 30% the stiffness of a 1000 micron long beam. To accommodate the longer beam 314, a trailing end 316 of the beam 314 extends beyond the trailing side surface 26 of the slider 24, and the beam 314 is extended about 300 microns into the stator pad portion 64.

The point contact 186 of the alignment clip is maintained substantially ahead of the trailing side surface 26 of the slider 24. The trailing side 26 of the slider 24 typically includes the recording head encapsulated in alumina, and trailing corners 318 of the slider 24 often chip during dicing such that a tight width tolerance is not maintained on the trailing corners 318. The point contacts 186 are accordingly positioned far enough forward to contact the slider 24 on the dice cut edges 80 of the slider body.

Extension of the beam 314 into the stator pad portion 64 is made possible in part by sifting the stator 312 forward. Cores 320 of the stator 312 have poles 322 which are asymmetric and skewed rearward relative to the coils 176. The microactuator suspension 30 of FIG. 39 has an overall footprint which is nearly the same size as the footprint of the microactuator suspension 30 of FIGS. 34–38.

Figure 40:
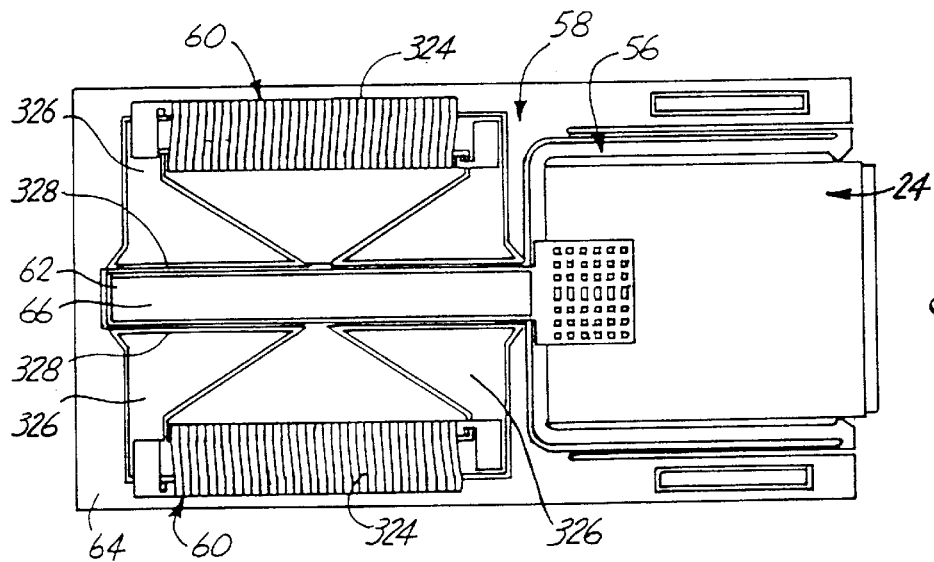
FIG. 40 is a plan view of a microactuator suspension and slider with another alternative embodiment of a stator.

FIG. 40 shows an alternative stator design, with a longer tongue portion 66 and magnetically responsive element 62 and with a single coil 324 per stator 60. Cores 326 have wide pole faces 328 to increase the magnetic force provided. The pole faces 328 are displaced relative to the coil 324, that is, the axis of the coil 324 does not extend through the pole faces 328. Microactuation occurs in the embodiment of FIG. 40 in the same way as previously described, with a microactuation force which is generated to move the slider attachment pad 56 relative to the suspension arm attachment pad 58.

The embodiment of FIG. 40 has a larger footprint than previous embodiments. In contrast to the embodiment of FIGS. 34–38, the stator pad portion 64 is longer than the slider 24. The embodiment of FIG. 40 is accordingly beneficial when footprint size does not constrain the design. Workers skilled in the art will appreciate that many alternative stator designs are possible depending upon the relative importance of the various constraints discussed herein.

Figure 41:
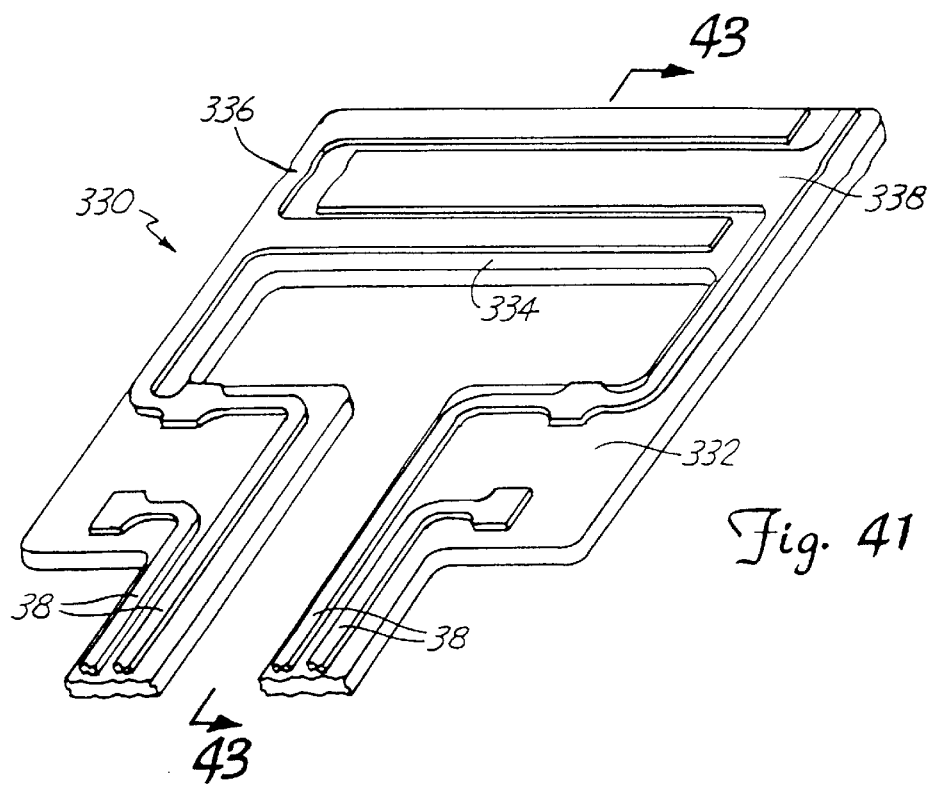
FIG. 41 is a perspective view of an alternative gimbal as viewed from the disc side.

FIG. 41 shows an alternative gimbal 330 as viewed from the disc side. The gimbal 330 can be used with any of the microactuator suspension designs disclosed herein or others. The gimbal 330 incorporates leads 38 for the stators 60 (shown in other figures) onto a flexible, resilient substrate 332. In particular, the trailing leads 38 further extend onto a loading bridge 334. One of the leads 38 extends to form a first bridge abutment 336 with an "F" shape. An opposing lead 38 extends to form a second bridge abutment 338 with an upside-down "L" shape mating in between arms of the "F" shape of the first bridge abutment 336. The bridge abutments 336, 338 contribute to the rigidity and strength of the gimbal 330.

Heat is generated in the coils 176 of the stators 60 due to the magnitude of the electrical current used in the motive element 42. Depending upon the magnitude of current used/heat generated, specific steps may need to be taken to assist in heat dissipation. For example, 2 Ohm coils 176 driven at about 120 mA produces about 30 mW of power, a significant portion of which is lost as heat in the coils 176. The temperature of the contacts 78 for the coils 176 should be maintained lower than the melting temperature of any solder used to connect the electrical leads 38. For example, standard eutectic solders should be maintained at a temperature less than about 180° C. during use of the disc drive 10. In addition to contributing rigidity and strength to the gimbal 330, the bridge abutments 336, 338 also act as cooling fins to dissipate heat from the coils 176. Heat is transmitted from the bridge abutments 336, 338 via convection into the wind generated by the moving disc 12 (shown in FIG. 1).

The bridge abutments 336, 338 should be formed of a material which is both electrically and thermally conductive. For example, the bridge abutments 336, 338 may be formed of copper, gold, or an alloy thereof. The substrate 332 is formed of a material which is flexible, and preferably also electrically insulative. The preferred substrate 332 is formed of polyimide. Alternatively, if the substrate 332 is formed of an electrically conductive material, the leads 38 may be electrically insulated from each other by different means.

Figure 42:
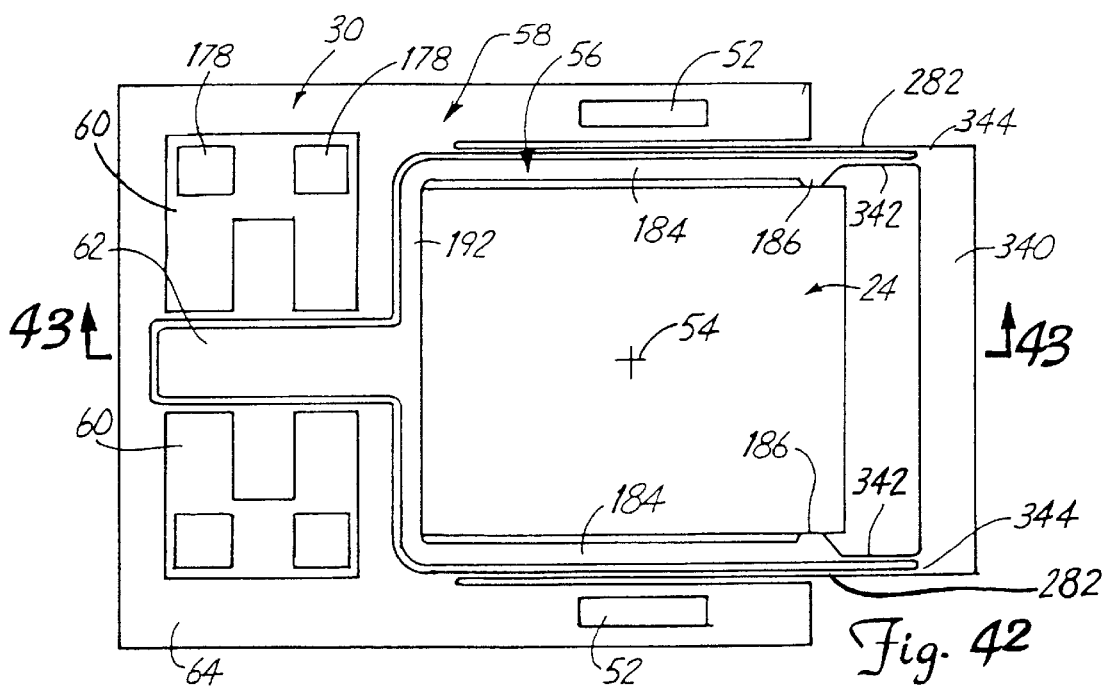
FIG. 42 is a plan view of a slider and an alternative microactuator suspension with a crossbar.
Figure 43:
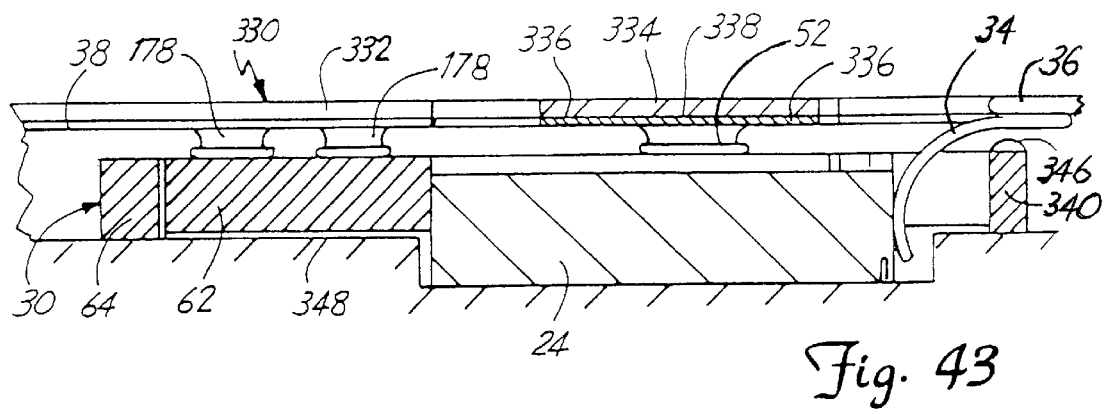
FIG. 43 is a cross-sectional view taken along lines 43—43 of the slider and microactuator suspension of FIG. 25 during assembly with the gimbal of FIG. 41.

FIG. 42 shows an alternative embodiment, and FIG. 43 shows a side view of the embodiment of FIG. 42 during assembly with the gimbal 330 of FIG. 41 The embodiment of FIG. 42 is similar to the embodiment of FIG. 33, but additionally a crossbar 340 is provided at a trailing end of the slider attachment pad 56 of the microactuator suspension 30. The front butt-up section 192, the side arms 184 and the crossbar 340 together form a framing portion which encircles the slider 24. Microactuation occurs in the embodiment of FIGS. 41–43 in the same way as previously described, with a microactuation force which is generated to move the slider attachment pad 56 relative to the suspension arm attachment pad 58. The beam 282 extends into the crossbar 340, and the crossbar 340 moves laterally with the slider attachment pad 56 during microactuation.

A trailing side arm portion 342 extends from each point contact 186 to the crossbar 340. The clip force provided at the point contact 186 involves both bending of each side arm 184 and bending of each trailing side arm portion 342. The longitudinal location of the point contact 186 determines the ratio between the length of the trailing side arm portion 342 and the length of the side arm 184. In the preferred embodiment, the trailing side arm portion 342 is both narrower and shorter than the side arm 184, but both the side arm 184 and the trailing side arm portion 342 have about the same flexibility and bear equal stress loads due to upper slider widths. Because the crossbar 340 fixes the lateral distance between trailing ends 344 of the two beams 282, flexing of the side arms 184 and trailing side arm portions 342 due to upper slider widths neither flexes nor induces stress into the beams 382.

Figure 44:
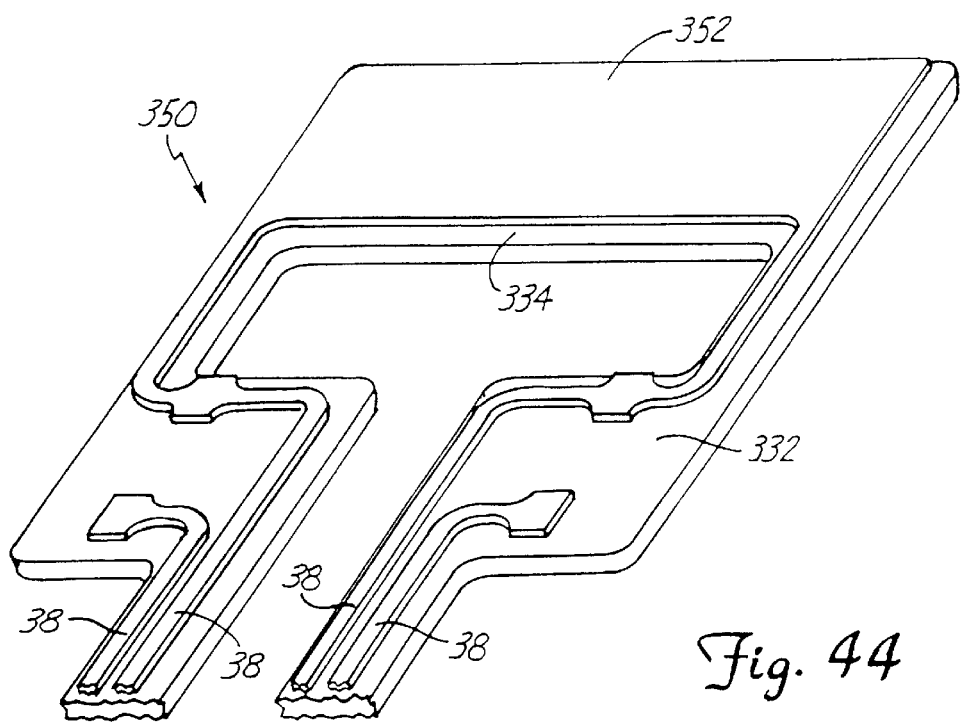
FIG. 44 is a perspective view of another alternative gimbal as viewed from the disc side.

As best shown in FIG. 44, an electrical insulator 346 may be deposited over the crossbar 340 to insulate it from the leads 38 to the transducer. For example, the electrical insulator 346 may be formed of alumina. Assembly is performed with a tooling template 348 that allows the slider 24 to be pressed upward between the point contacts 186 while the microactuator suspension 30 is pressed downward over the slider 24.

FIG. 44 shows an alternative gimbal 350 as viewed from the disc surface. The trailing leads 38a are electrically grounded and thus may be connected together. A single bridge abutment 352 is provided which extends substantially full width and length across the loading bridge 334 of the substrate 332. The single bridge abutment 352 contributes to rigidity and strength of the gimbal 350 in supporting both preload and stiction loads. Similar to the embodiment of FIG. 42, the single bridge abutment 352 serves an additional function as a cooling fin for the coils 176 of the motive element 42 (not shown in FIG. 44).

The thickness of the bridge abutment 336, 338, 352 and the substrate 332 can be chosen based on the desired deflection under the preload force. For a preload force of about 4 gmf, a bridge abutment 352 which is 0.7 mils thick with no substrate deflects about 70 microns. The preferred gimbal 350 with a 0.7 mil copper bridge abutment 352 on a 2.0 polyimide substrate 332 deflects about 14 microns. If less deflection is desired, plating the 2.0 polyimide substrate 332 on the top side with a second layer of 0.7 mil copper will reduce deflection under a 4 gmf preload to about 1 micron.

Although the present invention has been described with reference to preferred embodiments, workers skilled in the art will recognize that changes may be made in form and detail without departing from the spirit and scope of the invention. For example, the various beam designs, slider attachment pads, motive elements, gimbal designs, etc. disclosed and discussed can be combined together with each other or with prior art structures in numerous ways.

What is claimed is:

1. A structure for supporting a slider from a suspension arm, the structure comprising:
   a microactuator for finely positioning the slider above a surface of a storage medium; and
   a microactuator suspension attachable to the suspension arm, the microactuator suspension comprising:
      a slider attachment pad;
      a first resilient support extending from the slider attachment pad, wherein the first resilient support is flexible and resilient in an x-direction, is comparatively rigid in a z-direction, and damps vibration of the microactuator suspension to provide the microactuator with sufficient stroke to compensate for vibration of the suspension at frequencies up to about 21,000 hertz; and
      a suspension arm attachment pad extending from the first resilient support.

2. The structure of claim 1 and further comprising a second resilient support extending from the slider attachment pad, wherein the second resilient support is flexible and resilient in an x-direction, is comparatively rigid in a z-direction, and damps vibration of the microactuator suspension to provide the microactuator with sufficient stroke to compensate for vibration of the suspension at frequencies up to about 21,000 hertz.

3. The structure of claim 2 wherein the first and second resilient supports comprise flexible beams.

4. The structure of claim 2, wherein the slider attachment pad, first and second resilient supports, and the suspension arm attachment pad are unitarily formed from a metal substrate.

5. A structure for supporting a slider from a suspension arm and minimizing vibration of the slider, the structure comprising:
   a slider having a disc-opposing face, a back face opposite the disc-opposing face, and side faces running from the disc-opposing face to the back face; and
   a microactuator supporting the slider, the microactuator comprising:
      a slider attachment pad attached to the slider;
      a first resilient support extending from the slider attachment pad, the first resilient support being flexible and resilient in an x-direction parallel to the disc-opposing face for micro-actuation of the slider and being comparatively rigid in a z-direction perpendicular to the disc-opposing face, wherein the first resilient support damps vibrations at the slider to provide the microactuator with sufficient stroke to compensate for vibration of the slider at frequencies up to about 21,000 hertz; and
      a suspension arm attachment pad extending from the first resilient support.

6. The microactuator of claim 5, wherein the microactuator further comprises:
   a second resilient support extending from the slider attachment pad to the suspension arm attachment pad, the second resilient support being flexible and resilient in the x-direction for micro-actuation of the slider and being comparatively rigid in the z-direction to dampen vibrations at the slider caused by vibrations of the suspension arm;
   wherein the second resilient support damps vibrations at the slider so that the microactuator has sufficient stroke to compensate for vibration of the slider at frequencies up to about 21,000 hertz.

7. The microactuator of claim 5, wherein the first resilient support comprises:
   a first beam extending from a leading end to a trailing end and having a first beam length between its leading and trailing ends; and
   a second beam extending from a leading end to a trailing end and having a second beam length between its leading and trailing ends;
   wherein the first beam length is not equal to the second beam length.

8. The microactuator of claim 5, wherein the first resilient support comprises:
   a first beam extending longitudinally from a first beam leading end to a first beam trailing end; and
   a second beam extending longitudinally from a second beam leading end to a second beam trailing end, wherein at least one of the second beam leading end and the second beam trailing end is longitudinally offset from a corresponding one of the first beam leading end and first beam trailing end.

9. A slider suspension system in a disc drive for damping vibrations experienced by the slider, the slider suspension system comprising:
   an actuator arm for positioning the slider over a selected track of a disc;
   a load beam connected to the actuator arm;
   a microactuator connected to the load beam for carrying the slider and damping vibrations experienced by the slider, wherein the microactuator comprises a stator and a rotor connected by flexible beam springs, wherein the rotor carries the slider and the flexible beams allow the rotor to move relative to the stator and wherein the microactuator has sufficient stroke to compensate for vibrations of the suspension at frequencies up to about 21,000 hertz.

10. The slider suspension of claim 9 wherein the microactuator comprises flexible beams having a high aspect ratio.

11. The slider suspension of claim 10 wherein a width of the flexible beam is 0.0145 times a length of a length of the beam.

12. The slider suspension of claim 10 wherein the beams are flexible and resilient in the x-direction, but are comparatively rigid in the z-direction.

13. The slider suspension of claim 10 wherein the flexible beams attenuate suspension vibrations occurring at frequencies above the characteristic resonant frequency of the slider suspension.

14. The slider suspension of claim 13 wherein the resonant frequency of the slider suspension occurs at about 1000 hertz.

15. A structure for supporting a slider from a suspension arm, the structure comprising:
   a microactuator suspension attachable to the suspension arm, wherein the microactuator suspension comprises:
      a slider attachment pad;
      a first resilient support extending from the slider attachment pad, wherein the first resilient support is flexible and resilient in an x-direction, is comparatively rigid in a z-direction, and provides the means for damping vibration of the slider; and
      a second resilient support extending from the slider attachment pad, wherein the second resilient support is flexible and resilient in an x-direction, is comparatively rigid in a z-direction, and provides the means for clamping vibration of the slider;
   wherein the slider attachment pad, first and second resilient supports, and the suspension arm attachment pad are unitarily formed from a metal substrate.

16. A slider suspension system in a disc drive for damping vibrations experienced by the slider, the slider suspension system comprising:
   an actuator arm for positioning the slider over a selected track of a disc;
   a load beam connected to the actuator arm;
   flexible beams having a high aspect ratio connected to the load beam for carrying the slider and damping vibrations experienced by the slider, wherein the flexible beams attenuate suspension vibrations occurring at frequencies above about 1000 hertz, which is about the resonant frequency of the slider suspension.

* * * * *